(12) United States Patent
Takagi

(10) Patent No.: US 7,337,817 B2
(45) Date of Patent: Mar. 4, 2008

(54) RADIAL TIRE WITH CIRCUMFERENTIAL SPIRALLY WOUND BELT LAYER

(75) Inventor: Shigemasa Takagi, Gifu (JP)

(73) Assignee: Fuji Seiko Co., Ltd., Hashima-shi (JP)

( * ) Notice: Subject to any disclaimer, the term of this patent is extended or adjusted under 35 U.S.C. 154(b) by 35 days.

(21) Appl. No.: 10/533,820

(22) PCT Filed: Nov. 10, 2003

(86) PCT No.: PCT/JP03/14239

§ 371 (c)(1),
(2), (4) Date: May 3, 2005

(87) PCT Pub. No.: WO2004/041554

PCT Pub. Date: May 21, 2004

(65) Prior Publication Data

US 2005/0269008 A1    Dec. 8, 2005

(30) Foreign Application Priority Data

Nov. 8, 2002    (JP) ............................. 2002-325205

(51) Int. Cl.
B60C 9/18 (2006.01)
B60C 9/22 (2006.01)

(52) U.S. Cl. ...................... 152/526; 152/527; 152/531; 152/533

(58) Field of Classification Search ................ 152/526, 152/531, 533
See application file for complete search history.

(56) References Cited

U.S. PATENT DOCUMENTS 4,140,168 A * 2/1979 Caretta ........................ 152/527

5,419,383 A    5/1995 Iwamura
5,558,144 A    9/1996 Nakayasu et al.
6,926,053 B2 * 8/2005 Miyazaki et al. ........... 152/527

FOREIGN PATENT DOCUMENTS

| JP | 62-152904 |   | 7/1987 |
| JP | 2-128904 |   | 5/1990 |
| JP | 05000604 | * | 1/1993 |
| JP | 5-96909 |   | 4/1993 |
| JP | 5-286309 |   | 11/1993 |
| JP | 6-191219 | * | 7/1994 |
| JP | 8-318706 |   | 12/1996 |
| JP | 9-156312 |   | 6/1997 |
| JP | 2001-63310 |   | 3/2001 |

OTHER PUBLICATIONS

English translation of JP 2001-63310.*

* cited by examiner

Primary Examiner—Justin R. Fischer
(74) Attorney, Agent, or Firm—Oblon, Spivak, McClelland, Maier & Neustadt, P.C.

(57) ABSTRACT

At least one belt layer in which one or plural rubber-coated belt cords are arranged to be spirally wound almost in parallel with a tire circumferential direction on the outer circumference of a body ply. The belt cord is small in the increase rate of tensile load to stretch rate in the range of a predetermined stretch rate or less, but becomes large in the increase rate of the tensile load in another range exceeding the predetermined stretch rate. Therefore, during a vulcanizing and forming process, the belt cord is expanded together with unvulcanized compounded rubber under a small tensile load, and it does not occur to prevent body ply cords from being expanded, so that a green tire is vulcanized and formed with respective parts thereof being adhered as a result of being expanded to keep a correct shape.

7 Claims, 18 Drawing Sheets

FIG. 3
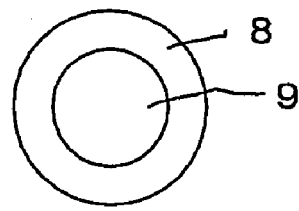
(a)
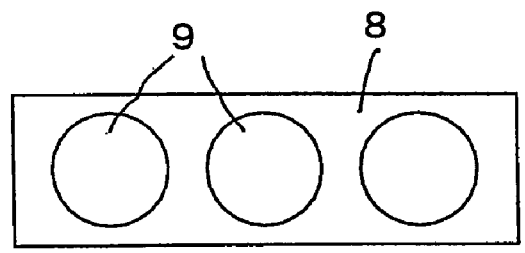
(b)
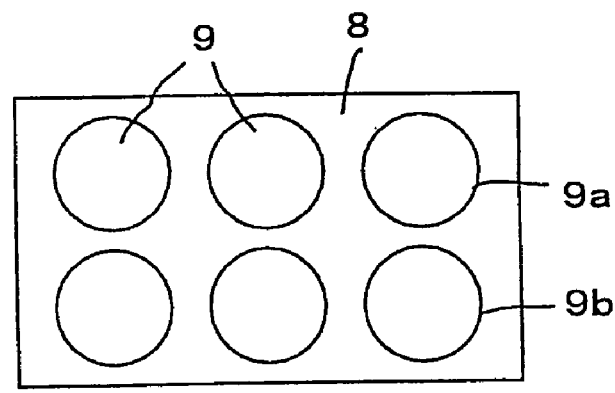
(c)

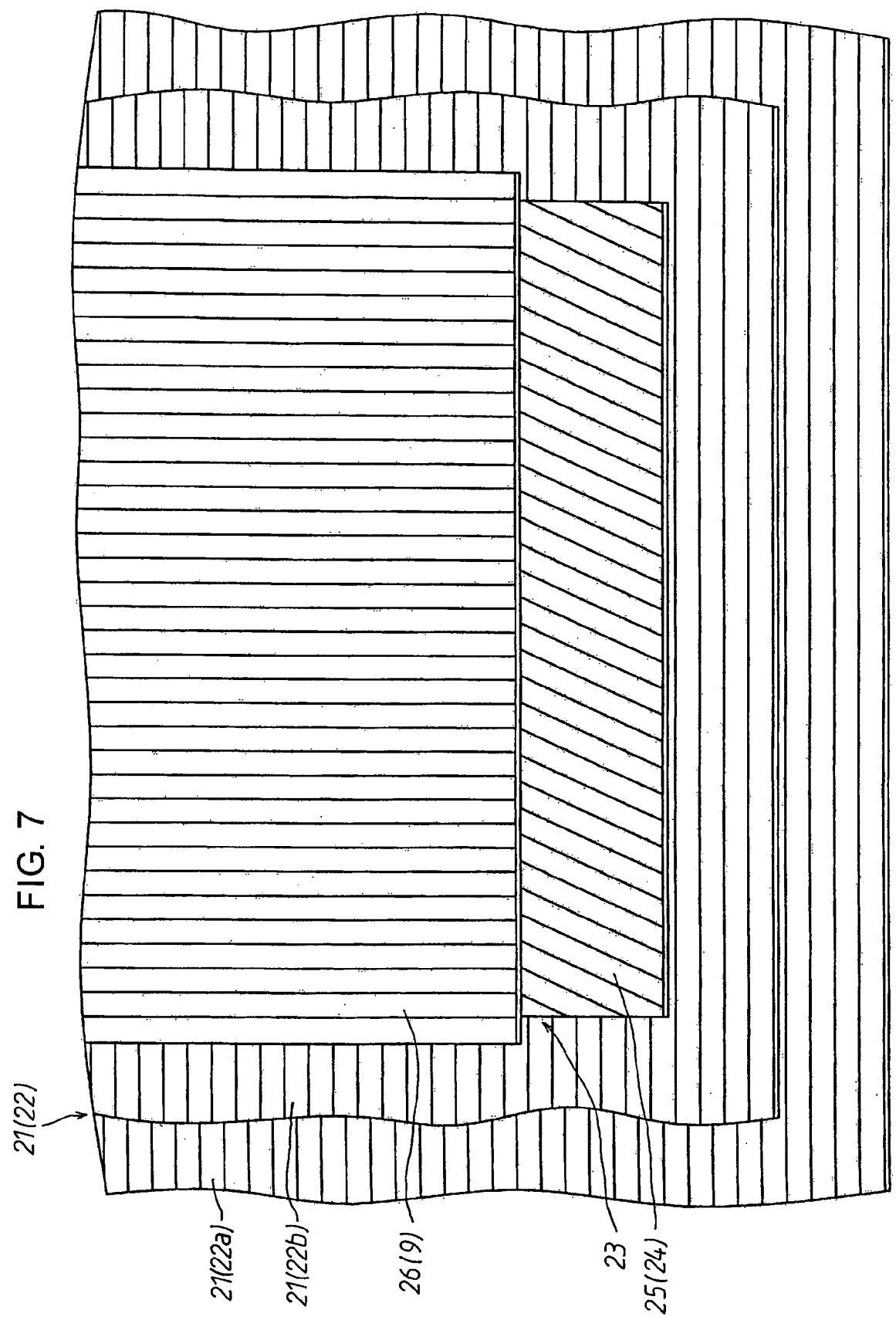

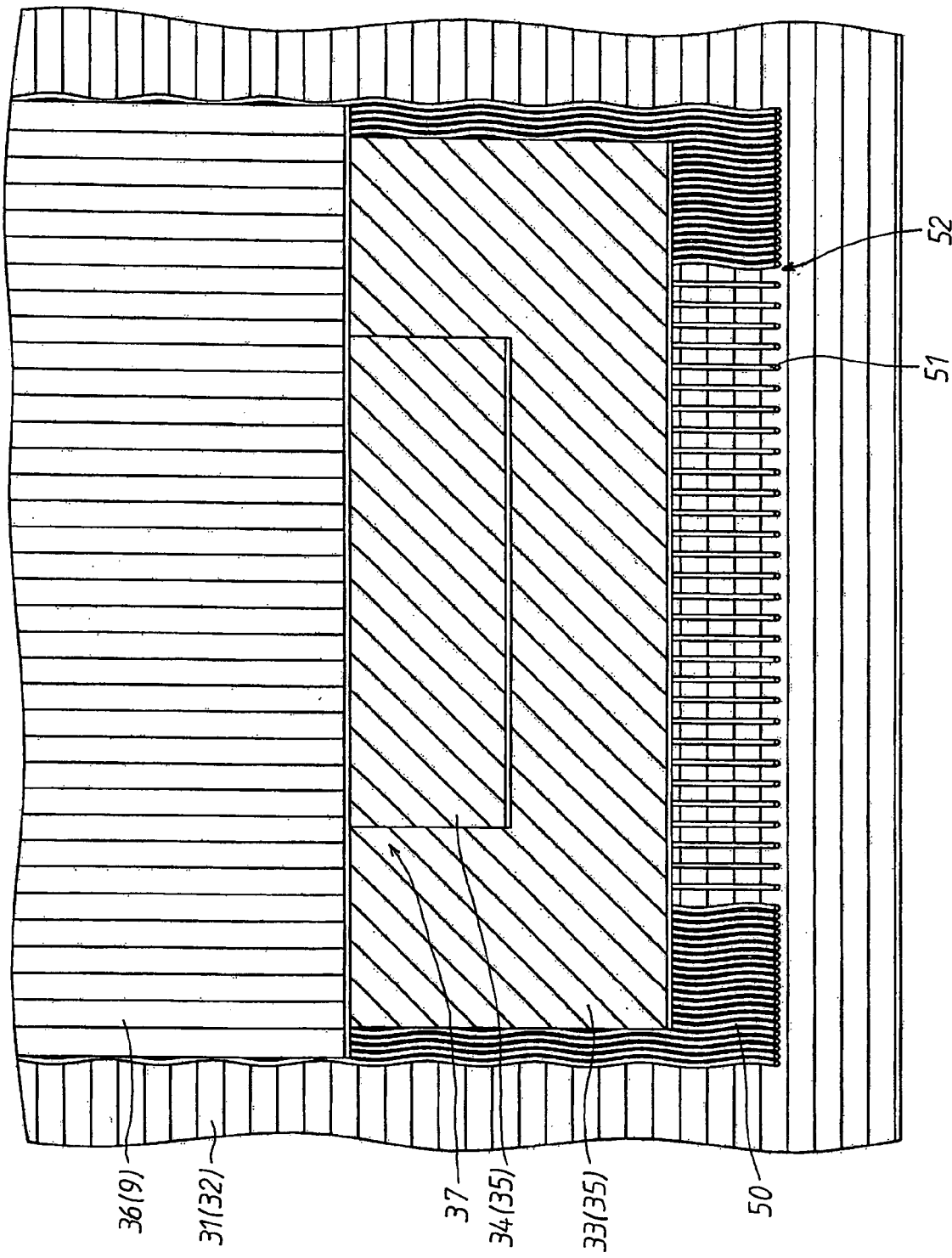

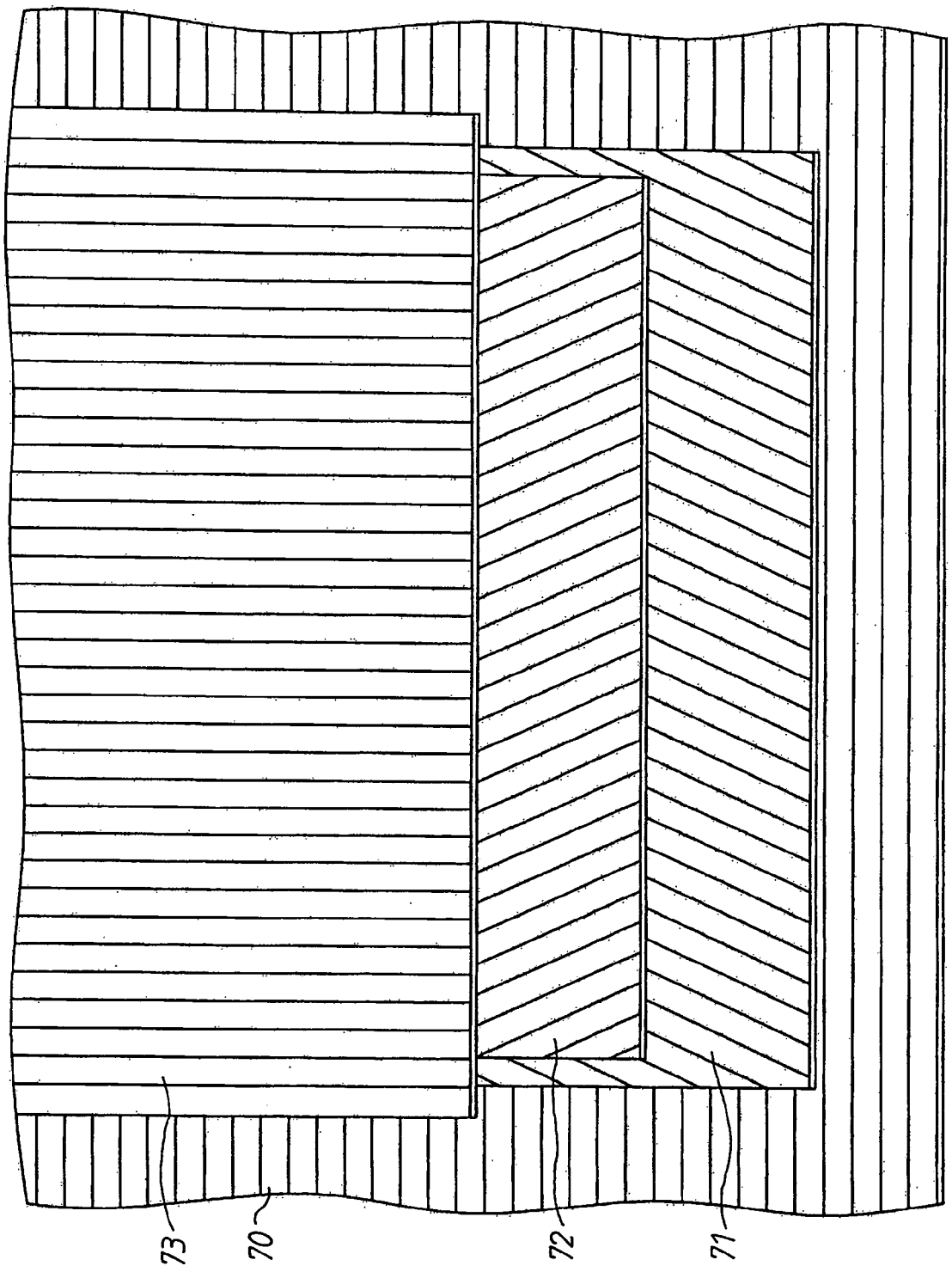

RADIAL TIRE WITH CIRCUMFERENTIAL SPIRALLY WOUND BELT LAYER

TECHNOLOGICAL FIELD

The present invention relates to a radial tire having belt cords of a belt layer which are arranged to be spirally wound almost in parallel with a tire circumferential direction.

BACKGROUND ART

For further enhancement of vehicle safety, it has been an increasing strong demand to improve the braking performance and the steering stability of tires contacting with a road surface. Another increasing strong demand is to lighten tires for improved fuel efficiency in terms of environment preservation. To this end, there has been proposed a radial tire described in Japanese unexamined, published patent application No. 62-152904. In the known radial tire, body ply cords which extend from a tread section to each sidewall section to be turned up over a bead core of a bead section are arranged in a radial cord fashion (arrangement at an angle in the range of 85 to 90 degrees relative to the tire circumferential direction), a secondary belt layer in which steel cords are inclined at an angle in the range of 20 to 40 degrees relative to the tire circumferential direction is arranged as a single layer over an outer circumference for a tread section of the body ply in the tire circumferential direction, and a steel cord or an organic fiber cord such as Kevlar® which is large in the increase rate of tensile load to stretch rate is spirally wound on an outer circumference side of the oblique belt layer almost in parallel with the tire circumferential direction to form a main belt layer. The belt layers are to prevent the movement of the body ply by a so-called "hoop effect" which suppress the radial expansion of the body ply for securing the steering stability, high-speed endurance and wear resistance which are characteristic performances of radial tires. As belt cords arranged in the belt layers, there have been used steel cords and aromatic polyamide fibers which are large in the increase rate of tensile road to stretch rate for a greater "hoop effect".

On the other hand, in Japanese unexamined, published patent application No. 8-318706, there is described a radial tire wherein PET (polyethylene terephthalate) fiber or nylon fiber which is small in the increase rate of tensile load to stretch rate is used for a circumferential belt layer with the ply structure appropriated.

Further, for a proper "hoop effect" by belt layers, a trial manufacture has been made of a radial tire, in which as shown in FIGS. 19 and 20, two secondary belt layers 71 and 72 whose respective steel cords are inclined in mutually opposite directions relative to the tire circumferential direction are arranged on an outer circumference side for a tread section of a body ply 70 in the tire circumferential direction, and an organic fiber cord is spirally wound on an outer circumference side of the oblique belt layer 72 at the outside almost in parallel with the tire circumferential direction thereby to form a main belt layer 73.

In vulcanizing a so-called "green tire" formed with unvulcanized compounded rubber in a manufacturing process of tires, the green tire is put in a mold and is vulcanized and formed in the mold with heat and pressure being applied inside. To obtain a target tire shape by the vulcanization and forming, the green tire is expanded within the mold to add a stretch of several percents or, in dependence upon the type of the forming method, 0.5 to 3%. Where there are employed conventional steel cords or aromatic polyamide fibers which hardly stretch because being large in the increase rate of tensile load to stretch rate, a problem arises in that they cannot be stretched by the pressure applied to the green tire up to 0.5 to 3%, whereby the green tire cannot be formed to a correct shape as a result that the body ply cords are prevented by the non-stretchable belt cord from being expanded. On the other hand, in the case of a radial tire which employs as belt cords PET or nylon fiber cords which are small in the increase rate of tensile load to stretch rate, there arises a problem that a sufficient hoop effect cannot be obtained after the vulcanization and forming.

The present invention is made to solve the aforementioned problems and is to provide a radial tire with a belt layer in which there is circumferentially spirally wound a belt cord capable of allowing the green tire to expand with a correct shape retained during a vulcanizing and forming process and also capable of exercising a sufficient hoop effect after the vulcanizing and forming process.

DISCLOSURE OF THE INVENTION

A first invention resides in a radial tire provided with a body ply extending from a tread section to sidewall sections and having at both side ends thereof turned-up portions which are turned up over bead cores of bead sections; a belt layer wound on an outer circumference of the body ply in a tire circumferential direction; a tread circumferentially arranged on an outer circumference of the belt layer; and bead fillers extending from the bead cores radially outward between the sidewall sections and the turned-up portions of the body ply, wherein the belt layer comprises at least one spirally wound belt layer in which one or plural belt cords coated with rubber are arranged to be spirally wound almost in parallel with the tire circumferential direction; and wherein the belt cord in the spirally wound belt layer is small in the increase rate of tensile load to stretch rate in the range of a predetermined stretch rate or less but is larger in the increase rate of tensile load in a range exceeding the predetermined stretch rate.

According to the present invention, since during a vulcanizing and forming process, the belt cord is expanded under a small tensile load not to prevent body ply cords from expanding, a green tire is vulcanized and formed with respective parts thereof being adhered as a result of being expanded to keep a regular shape. Thus, the tire is vulcanized and formed with the belt cord being expanded by the predetermined stretch rate and after the vulcanization, becomes large in the increase rate of tensile road to stretch rate to exercise a sufficient hoop effect. Therefore, the tire can be well maintained in a desired toroidal shape, can be increased in a forward-rearward rigidity in the tire circumferential direction, can suppress the movement of the treading surface, can be enhanced in the braking performance to avoid collisional accident, and further can make the shape of a ground contact surface on the treading surface proper. As a consequence, it becomes possible to make sudden starting and sharp steering as well as to enhance steering stability.

A second invention resides in a radial tire with the circumferentially spirally wound belt layer according to the aforementioned first invention, wherein the belt cord in the spirally wound belt layer is of the property that the stretch rate is equal to or greater than 0.5% at the tensile load of 20 N and that the tensile load at the stretch rate of 3% is equal to or greater than 60 N (preferably, the tensile load at the stretch rate of 1.5% is equal to or greater than 30 N).

According to the present invention, as is the case of the first invention, when the diameter of the green tire is expanded at an expansion rate in the rage of 0.5 to 3%, the tire is vulcanized and formed with respective parts thereof being adhered as a result of having the entire shape thereof maintained properly and after the vulcanization and forming, becomes large in the hoop effect that the belt layer suppresses the expansion of the body ply.

A third invention resides in a radial tire with the circumferentially spirally wound belt layer according to the aforementioned first or second invention, wherein the belt cord in the spirally wound belt layer is made of a hybrid cord having a nylon fiber bundle as a core and having an aramid fiber bundle twisted therearound.

According to the present invention, it can be realized to provide a light belt cord having a property that the increase rate of tensile load to stretch rate is small in the range of a predetermined stretch rate or less, but is large in the increase rate of tensile load in a range exceeding the predetermined stretch rate.

A fourth invention resides in a radial tire with the circumferentially spirally wound belt layer according to the aforementioned first or second invention, wherein the belt cord in the spirally wound belt layer is made of a multi-strand steel cord which is made by twisting plural steel strands.

According to the present invention, it can be realized to provide a belt cord which is small in the increase rate of tensile load to stretch rate in the range of a predetermined stretch rate or less, but abruptly increases the increase rate of tensile load in a range exceeding the predetermined stretch rate to have a large hoop effect.

A fifth invention resides in a radial tire with the circumferentially spirally wound belt layer according to the aforementioned first or second invention, wherein the belt cord in the spirally wound belt layer is made of a waved steel cord which is made by giving a waving processing to a steel cord which is made by twisting plural steel filaments.

According to the present invention, it can be realized to easily adjust the property of the steel belt cord which is large in the hoop effect as being small in the increase rate of tensile load to stretch rate in the range of a predetermined stretch rate or less, but abruptly increasing the increase rate of tensile load in a range exceeding the predetermined stretch rate.

A sixth invention resides in a radial tire with the circumferentially spirally wound belt layer according to any one of the aforementioned first to fifth inventions, wherein the body ply is arranged to be at least one layer; wherein body ply cords in the body ply are inclined at an angle in the range of 85 to 90 degrees relative to the circumferential direction; and wherein the belt layer arranged on the outer circumference of the body ply comprises an oblique belt layer in which a belt cord made of steel is arranged as one layer to be inclined at an angle in the range of 10 to 40 degrees relative to the circumferential direction and at least one spirally wound belt layer in which a belt cord is spirally arranged on an outer circumference of the oblique belt layer almost in parallel with the tire circumferential direction.

According to the present invention, in addition to the effects of the first invention, it can be realized to lighten the radial tire, to enhance the braking performance and the steering stability of the tire and to maintain the high-speed endurance and the wear resistance.

A seventh invention resides in a radial tire with the circumferentially spirally wound belt layer according to any one of the aforementioned first to third inventions, wherein the body ply is arranged to be at least one layer; wherein body ply cords in the body ply are inclined at an angle in the range of 85 to 90 degrees relative to the circumferential direction; and wherein the belt layer arranged on the outer circumference of the body ply comprises two oblique belt layers in which belt cords made of steel are arranged to be inclined in the same direction at the same angle in the range of 30 to 60 degrees (preferably, in the range of 40 to 50 degrees) relative to the circumferential direction and at least one spirally wound belt layer in which a rubber-coated belt cord made of a hybrid cord is spirally arranged on outer circumferences of the oblique belt layers almost in parallel with the tire circumferential direction; and wherein of the two oblique belt layers, one oblique belt layer is in the range of 40 to 70% of the other oblique belt layer in width and is circumferentially arranged at the center portion in the direction of the radial tire width.

According to the present invention, by the hoop effects of the two belt layers inclined in the same direction and the circumferentially spirally wound belt layer, it can be realized to enhance the braking performance, the steering stability and the wear resistance of the tire and in particular, to enhance the braking effect on wet roads. It is usual that in the steel belt arranging structure, two belt layers are arranged to have respective belt cords wound and inclined in opposite directions and crossed mutually. In that case, respective belt cords interfere to be twisted, and this causes the distribution of the ground contact pressure on the ground contact surface to be uneven and not to become flat, so that though the ground contact area appears unchanged, there is decreased a substantial ground contact area which works for the braking performance and the steering stability. On the other hand, in the present invention, since the two oblique belt layers are wound with the belt cords being inclined at the same angle in the same direction, the distribution of the ground contact pressure on the ground contact surface becomes even and flat, so that though the ground contact area appears unchanged, the substantial ground contact area which works for the braking performance and the steering stability can be made to be large thereby to improve the braking performance and the steering stability. Further, since one oblique belt layer of the two oblique belt layers is in the range of 40 to 70% of the other oblique belt layer in width and is circumferentially arranged at the center portion in the direction of the radial tire width, the floating motion which is liable to occur at the center portion of the tread surface when a sudden increase in load is brought about upon braking can be suppressed, and the flexibility of the tread section can be maintained.

An eighth invention resides in a radial tire with the circumferentially spirally wound belt layer according to the aforementioned seventh invention, wherein an organic fiber cord made of a hybrid cord is coated with rubber and is arranged to be spirally wound between the oblique belt layers and the outer circumference of the body ply almost in parallel with the circumferential direction thereby to form a ply under the oblique belt layers; and wherein the arrangement of the organic cords in the ply under the oblique belt layers is made to be densified at shoulder portions on the side edges in the direction of the radial tire width and is made to be loose at the center portion.

According to the present invention, the ply under the oblique belt layers is arranged on the outer circumference of the body ply to extend from the shoulder portions to the center portion, and thus, when a sudden load acts upon braking, the ply under the oblique belt layers suppresses the separations between the body ply cords, so that differences in tension among the body ply cords can be lessened to enhance the braking performance. Further, the cord in the ply under the oblique belt layers is arranged to be densified at the shoulder portions and to be loose at the center portion, and thus, when an inside pressure is applied to the tire, the ground contact state of the shoulder portions can be kept stable because of the densified arrangement of the organic fiber cord thereat, so that it can be realized to remarkably enhance the steering stability and the braking performance of the tire on wet roads and also to enhance the braking performance and the wear resistance on dry roads. At the center portion, the organic fiber cord is arranged to be loose, so that the separations between the body ply cords can be suppressed without deteriorating the flexibility.

A ninth invention resides in a radial tire with the circumferentially spirally wound belt layer according to the aforementioned seventh invention, wherein a ply under the oblique belt layers is composed of a waved steel cord coated with rubber and arranged to be spirally wound and to be densified between the oblique belt layers and the outer circumference of the body ply at shoulder portions on the side edges in the direction of the radial tire width almost in parallel with the circumferential direction and an organic fiber cord made of a hybrid cord coated with rubber and arranged to be spirally wound and to be loose between the oblique belt layers and the outer circumference of the body ply at the center portion almost in parallel with the circumferential direction.

According to the present invention, when a sudden load acts upon braking, the ply under the oblique belt layers suppresses the separations between the body ply cords, so that differences in tension among the body ply cords can be lessened to enhance the braking performance. Further, since the waved steel cord is employed as the material at the shoulder portions of the ply under the oblique belt layers, the shoulder portions of the radial tire are increased in rigidity and further are stabilized in the ground contact state upon sudden braking. Thus, remarkable improvements can be made in the braking performance and the steering stability of the tire on wet roads, and improvements can also be made in the braking performance and the wear resistance on dry roads. By the organic fiber cord spirally wound to be loose, the floating of the center portion can be suppressed to the extent that the flexibility cannot be deteriorated.

A tenth invention resides in a radial tire with the circumferentially wound belt layer according to the aforementioned seventh invention, wherein a cord which is small in the increase rate of tensile load to stretch rate in the range of a predetermined stretch rate or less but is large in the increase rate of tensile load in a range exceeding the predetermined stretch rate is coated with rubber and is arranged to be spirally wound between the oblique belt layers and the outer circumference of the body ply almost in parallel with the circumferential direction thereby to form a ply under the oblique belt layers, and wherein the cord in the ply under the oblique belt layers is arranged to be densified at the shoulder portions on the side edges in the direction of the radial tire width and at the center portion, but to be loose at a portion between each shoulder portion and the center portion.

According to the present invention, the ply under the oblique belt layers is arranged on the outer circumference of the body ply to extend from the shoulder portions to the center portion, and thus, when a sudden load acts upon braking, the ply under the oblique belt layers suppresses the separations between the body ply cords, so that differences in tension among the body ply cords can be lessened to enhance the braking performance. In addition, since the cord in the ply under the oblique belt layers is arranged to be densified at the shoulder portions and the center portion and to be loose at the portion between each shoulder portion and the center portion, the loose portion serves for lightening the tire, and at the same time, the ground contact state is kept to be always stable at the shoulder portions and the center portion where the cord arrangement is densified. Thus, remarkable improvements can be made in the steering stability and the braking performance of the tire on wet roads, and improvements can also be made in the braking performance and the wear resistance on dry roads. Because of being densified at the center portion, the floating of the center portion in high speed traveling can be suppressed to improve the steering stability in high speed traveling.

An eleventh invention resides in a radial tire with the circumferentially spirally wound belt layer according to the aforementioned tenth invention, wherein a cord which is small in the increase rate of tensile load to stretch rate in the range of a predetermined stretch rate or less but is large in the increase rate of tensile load in a range exceeding the predetermined stretch rate is coated with rubber and is arranged to be spirally wound between the spirally wound belt layer and the oblique belt layers almost in parallel with the circumferential direction thereby to form a ply under the spirally wound belt layer, and wherein the cord in the ply under the spirally wound belt layer is arranged to be densified at the shoulder portions on the side edges in the direction of the radial tire width and at the center portion, but to be loose at the portion between each shoulder portion and the center portion.

According to the present invention, when a sudden load acts upon braking, the ply under the oblique belt layers suppresses the separations between the body ply cords, so that differences in tension among the body ply cords can be lessened to enhance the braking performance. In addition, the shoulder portions and the center portion are heightened in rigidity, and the ground contact state at the shoulder portions upon sudden braking is stabilized. Thus, remarkable improvements can be made in the braking performance and the steering stability of the tire on wet roads, and improvements can also be made in the braking performance and the wear resistance on dry roads. The floating of the center portion in high speed traveling can be suppressed to improve the steering stability in high speed traveling. Furthermore, since the ply under the spirally wound belt layer is arranged between the circumferentially spirally wound belt layer and the oblique belt layers, the hoop effect on the body ply can further be strengthened thereby to improve the steering stability and the wear resistance. In addition, since the steel cords in the oblique belt layers are sandwiched and tied by the ply under the spirally wound belt layer and the ply under the oblique belt layers to be densified at the shoulder portions and the center portion, the movement of the steel cords in the oblique belt layers is restricted during the rolling of the tire, whereby reduction can be made in the noise in the car on rough roads.

A twelfth invention resides in a radial tire with the circumferentially spirally wound belt layer according to any one of the aforementioned sixth to eleventh inventions, wherein both side portions of the spirally wound belt layer cover both side portions of the oblique belt layers.

According to the present invention, it can be prevented that both side portions of the cords in the oblique belt layers are brought into contact with the tread internal surface thereby to become a core for troubles.

BRIEF DESCRIPTION OF THE DRAWINGS

FIG. 3 is a figure showing the states of a belt cord and belt cords coated with unvulcanized compounded rubber;

FIG. 7 is a figure showing body plies and the belt layers in the second embodiment;

FIG. 14 is a figure showing the arrangement of a body ply, the oblique belt layers and a ply under the oblique belt layers in the fifth embodiment;

FIG. 20 is a figure showing the arrangement of a body ply and belt layers of the prior art radial tire.

PREFERRED EMBODIMENTS TO PRACTICE THE INVENTION

Figure 1:
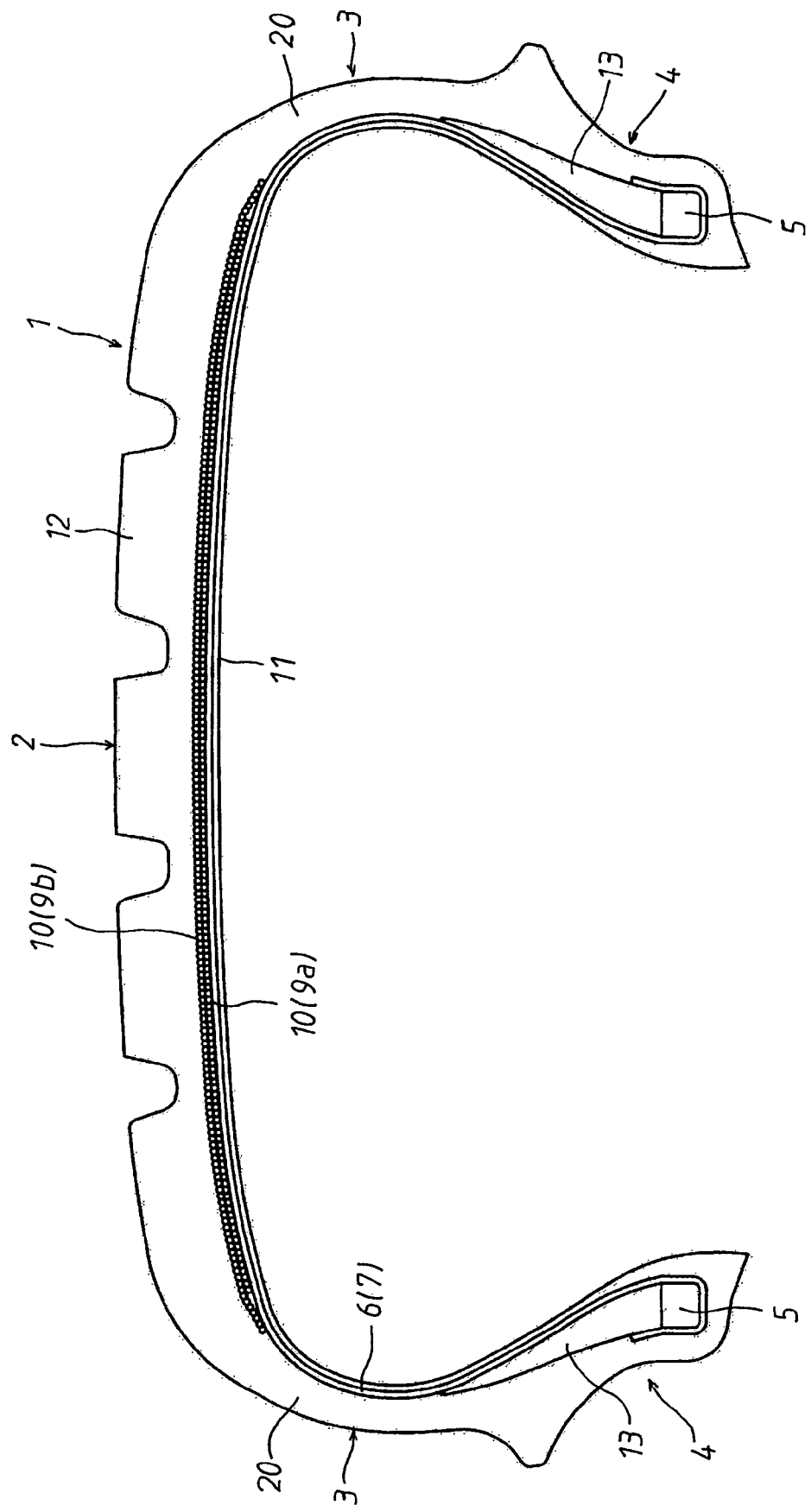
FIG. 1 is a sectional view of a radial tire, taken in a tire radial direction, having circumferentially spirally wound belt layers in a first embodiment.
Figure 2:
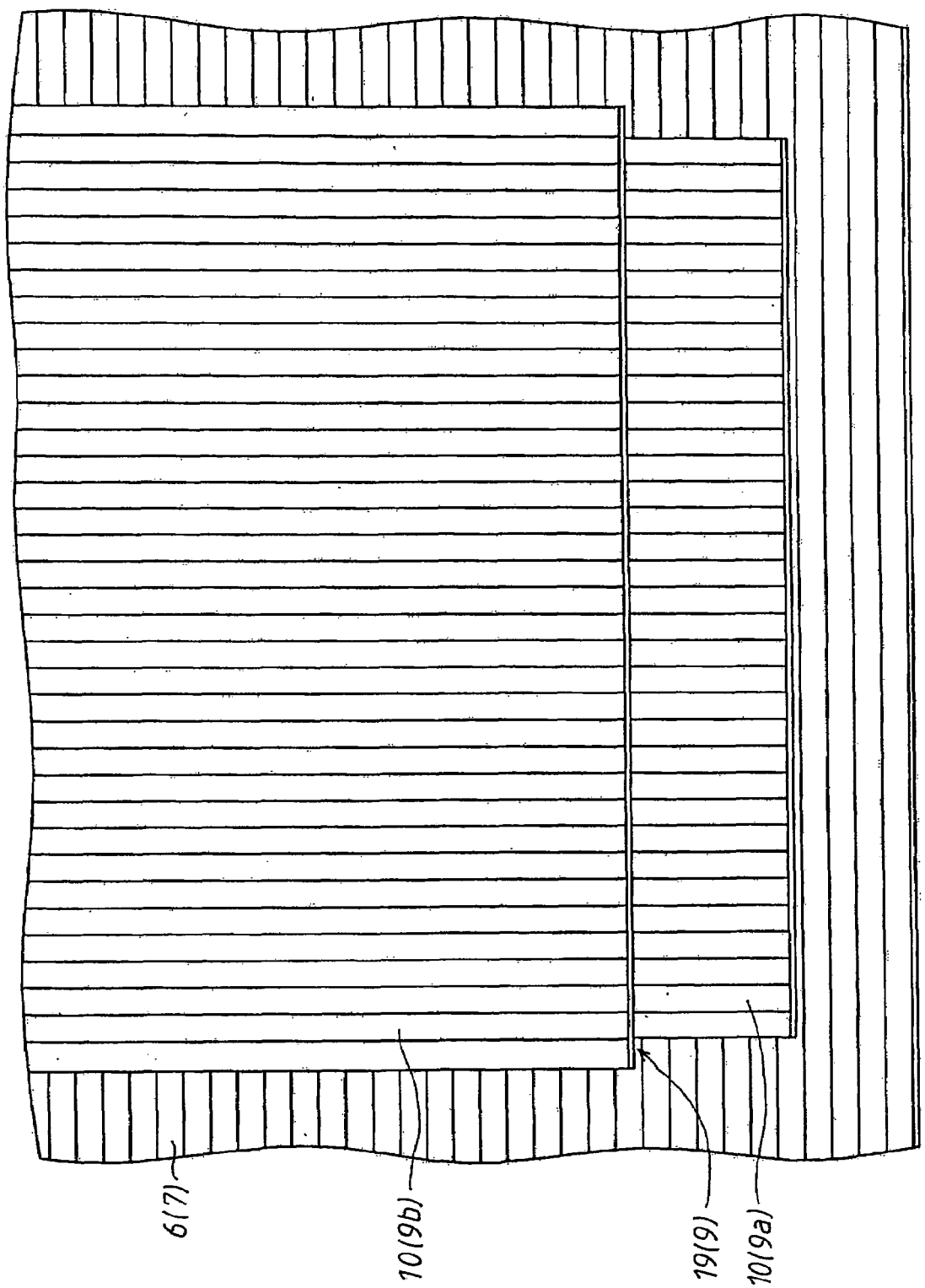
FIG. 2 is a figure showing a body ply and the belt layers in the first embodiment.

Hereafter, description will be made with reference to the accompanying drawings as to a radial tire having circumferentially spirally wound belt layers in the first embodiment in which the present invention is applied to a radial tire for passenger cars. As shown in FIGS. 1 and 2, the radial tire 1 is composed of a tread section 2, sidewall sections 3 at both sides of the tire radially bent from both sides of the tread section 2 toward the tire axis, and annular bead sections 4 constituting inner circumferences of the respective sidewall sections 3. The bead sections 4 at the both sides are provided with bead cores 5 each constituted by annually winding a steel cord. A body ply 6 extends from the tread section 2 to pass through the sidewall sections 3 at the both sides and then to be turned up over the respective bead cores 5, so that the body play 6 is suspended between the both side beads. In the body ply 6, body ply cords 7 are coated with rubber and are arranged at an oblique angel in the range of 85 to 90 degrees relative to the tire circumferential direction. With the arrangement of the body ply cords at the oblique angle in the range of 85 to 90 degrees as well as with an excellent hoop effect of a spirally wound belt layer 10 having the belt cord 9 spirally wound in the tire circumferential direction, the radial tire can easily be kept in a desired toroidal shape and thus, can be excellent in the braking performance and the steering stability.

The spirally wound belt layer 10 comprising two layers 9a and 9b is formed on the outer circumference of the body ply 6, and in each of the layers, a belt cord 9 having an appropriate tensile rigidity is coated with rubber and is spirally wound at an oblique angle in the range of 0 to 9 degrees almost in parallel with the tire circumferential direction. In this case, the spirally wound belt layer 10 may be formed by spirally winding a single belt cord 9 in turn for the first layer 9a and the second layer 9b with the circumferential surface of the belt cord 9 coated with unvulcanized compounded rubber as shown in FIG. 3(a). Or, the spirally wound belt layer 10 may be constituted by spirally winding plural belt cords simultaneously in turn for the first layer 9a and the second layer 9b with the plural belt cords coated with unvulcanized compounded rubber in a parallel arrangement to form a ribbon as shown in FIG. 3(b). Or, the spirally wound belt layer 10 may be constituted by spirally winding, by one turn, plural belt cords of double layers which are coated with unvulcanized compounded rubber in parallel arrangements with one layer for the first layer 9a piled up on the other layer for the second layer 9b as shown in FIG. 3(c). A manufacturing method of spirally winding the rubber-coated belt cords 9 on the outer circumference of the body ply 6 can be implemented by a known method described in, e.g., Japanese unexamined, published patent application No. 2002-137607 and is therefore omitted from being described.

As referred to later, finally, the belt cords 9 are spirally wound to form two layers almost in parallel with the tire circumferential direction with the increase rate of tensile load to stretch rate kept to be large. Thus, the hoop effect that the spirally wound belt layer 10 prevents the body ply 6 from expanding becomes large to keep the tire properly in a desired toroidal shape, and the forward-rearward rigidity in the tire circumferential direction can be increased to suppress the displacement of the tread surface, so that the braking performance can be enhanced to prevent collisional accidents. Further, the steering stability can be improved since sudden starting and sharp steering become possible.

An inner liner 11 is arranged on the internal surface of the body ply 6, a tread 12 is wound on the outer surface of the spirally wound belt layers 10, a bead filler 13 is arranged between each sidewall section and each turned-up portion of the body ply 6 to extend from each bead core 5 radially outward of the tire, and a side tread 20 is arranged at each of the sidewall section 3.

A green tire whose structure roughly described above is formed with unvulcanized compounded rubber is put into a vulcanizing mold, and then, an expansible shape fit in the internal surface of the inner liner 11 is expanded while they are heated up to about 200 degrees centigrade, whereby the inner liner 11, the body ply 6, the spirally wound belt layers 10 and the tread 12 are adhered and formed together through the vulcanization of the unvulcanized compounded rubber. The expansion of the expansible shape causes the tire outer diameter to expand at an expansion rate in the range of 0.5 to 3%, and therefore, unless the belt cords 9 can be expanded under a small tensile load during this expansion process, the correct tire shape cannot be kept as a result that the body ply cords 7 are prevented by the unexpanded belt cords 9 from being expanded.

Figure 4:
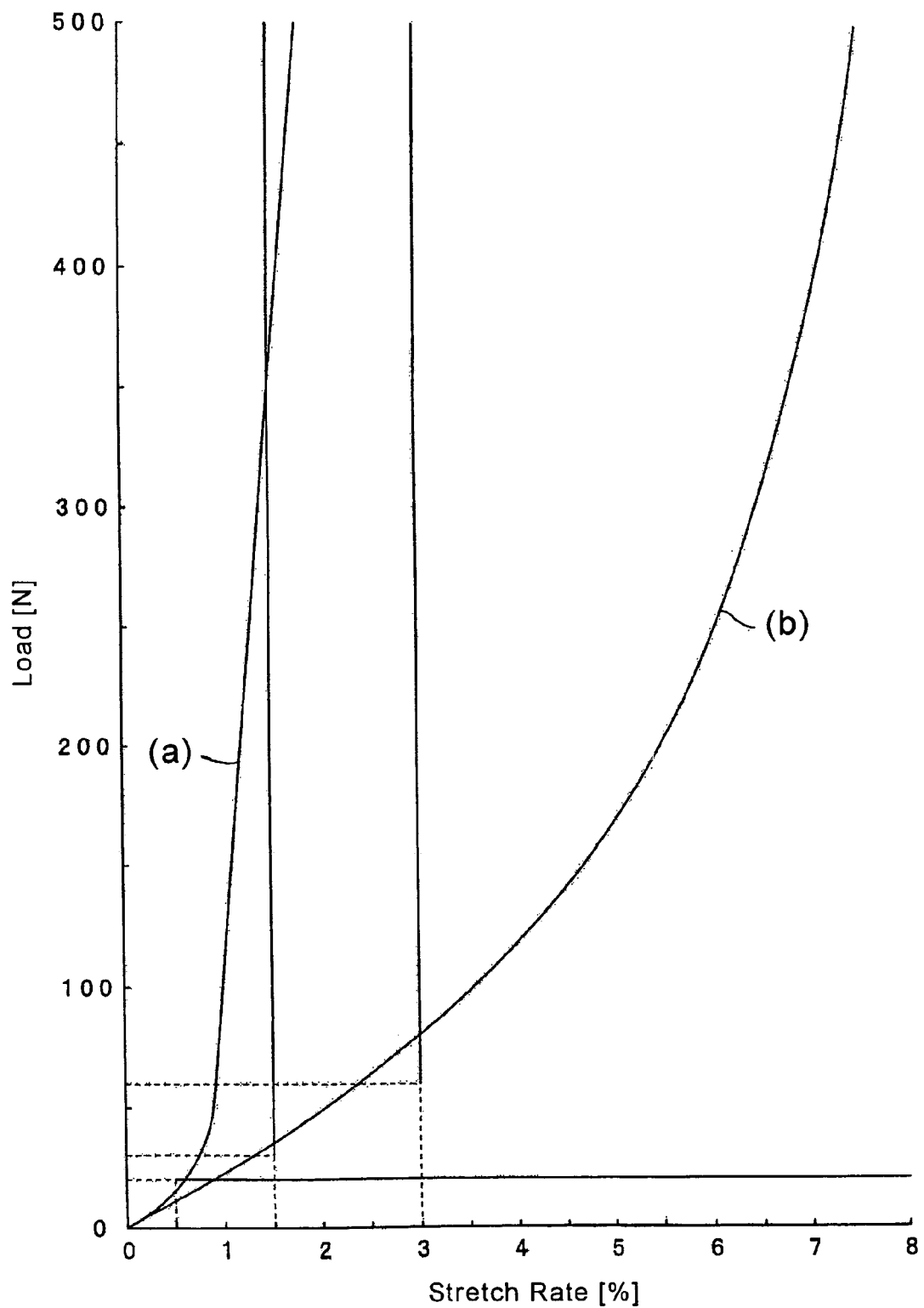
FIG. 4 is a graph showing tensile loads of belt cords relative to stretch rates.
Figure 5:
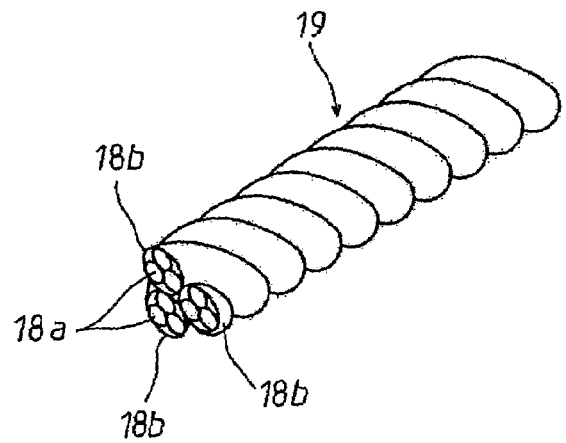
FIG. 5 is a perspective view of a multi-strand steel cord.

In view of the above, various tests were carried out with tire vulcanization and forming conditions changed. From the test results, it was found that in the case of using for the belt cords 9 a cord which was manufactured to have the property that as shown in FIG. 4, the stretch rate at the tensile load of 20 N (newton) is equal to or greater than 0.5% and that the tensile load at the stretch rate of 3% is equal to or greater than 60 N (preferably, the tensile load at the stretch rate of 1.5% is equal to or greater than 30 N), the inner liner 11, the body ply 6, the spirally wound belt layer 10 and the tread 12 were reliably adhered and vulcanized with the entire shape of the tire kept properly during the expansion of the expansible shape. In this case, since the tire is vulcanized and formed with the belt cord 9 being stretched at a stretch rate in the range of 0.5 to 3%, the vulcanized and formed tire is heightened in the tensile rigidity of the belt cord 9 and is increased in the hoop effect that the spirally wound belt layer 10 prevents the body ply 6 from expanding. Thus, the tire can be kept properly in a desired toroidal shape, so that improvements can be made in the braking performance and the steering stability.

The belt cord 9 used as one example in the first embodiment was a steel cord with a structure of 3×3×0.175. This is a multi-strand steel cord 19 having a cord diameter of 0.81 Φmm (millimeter) which cord is structured by twisting three steel filaments 18a of the diameter 0.175 Φmm to make a strand 18b and then by twisting three strands 18b so made at a short pitch. As indicated at (a) in FIG. 4, the property of the tensile load relative to the stretch rate of the multi-strand steel cord 19 indicates the stretch rate of 0.6% larger than 0.5% at the tensile load of 20 N, attains the tensile load of 350 N at the stretch rate of 1.5%. At a stretch rate equal to or less than about 0.5% which is a predetermined value, the increase rate of tensile load to stretch rate becomes small, but becomes large as the stretch rate exceeds the predetermined value.

Figure 15:
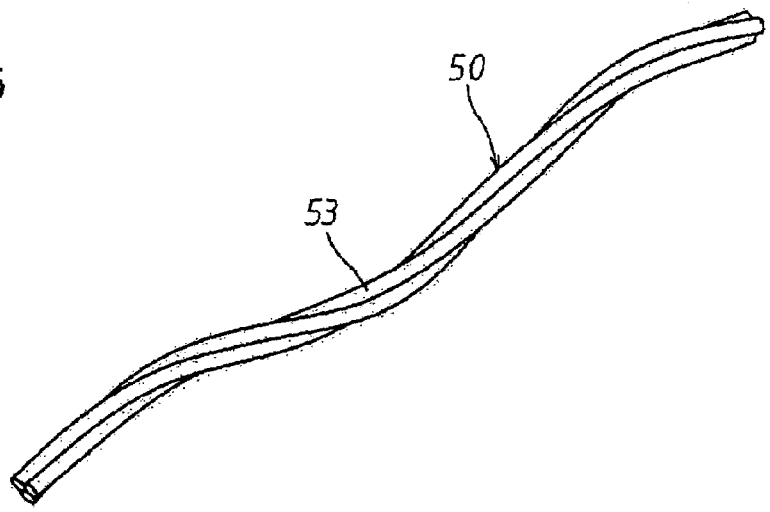
FIG. 15 is a perspective view of a steel cord given a waving processing.

The belt cord 9 used in the spirally wound belt layer 10 may be a waved steel cord 50 shown in FIG. 15. This waved steel cord 50 is made by waving a steel cord with the structure of 1×3×0.27 (i.e., a cord of 0.58 Φmm cord diameter which is made by twisting three steel filaments 53 each having 0.27 Φmm). In the waved steel cord 50, by altering the wave shape, it can be realized relatively easily to adjust a desired property that the increase rate of tensile load to stretch rate is small in a small load range but is large in a stretch rate range exceeding the predetermined value.

By the selection of the twisting method, any aramid cord which is large in the increase rate of tensile load to stretch rate and small in the stretch rate of each fiber itself or any steel cord can be made to a light belt cord having a desired property that the increase rate of tensile load to stretch rate is small in a small load range but is large in a stretch rate range exceeding the predetermined value.

The tensile tests for cords were performed by using a Model AGS-500A machine made by Shimadzu Corporation, Kyoto, Japan within a room which is maintained at 25 (room temperature)±3 degrees centigrade and 65% in relative humidity under the conditions of the grip-to-grip interval of 250 mm and the stretching speeds of 300 mm/min for organic fiber cords and 125 mm/min for steel cords. As cord samples, there were used those which were kept at a constant temperature (20±2 degrees centigrade) within a tightly-closed bottle filled with 36% sulfuric acid.

Figure 6:
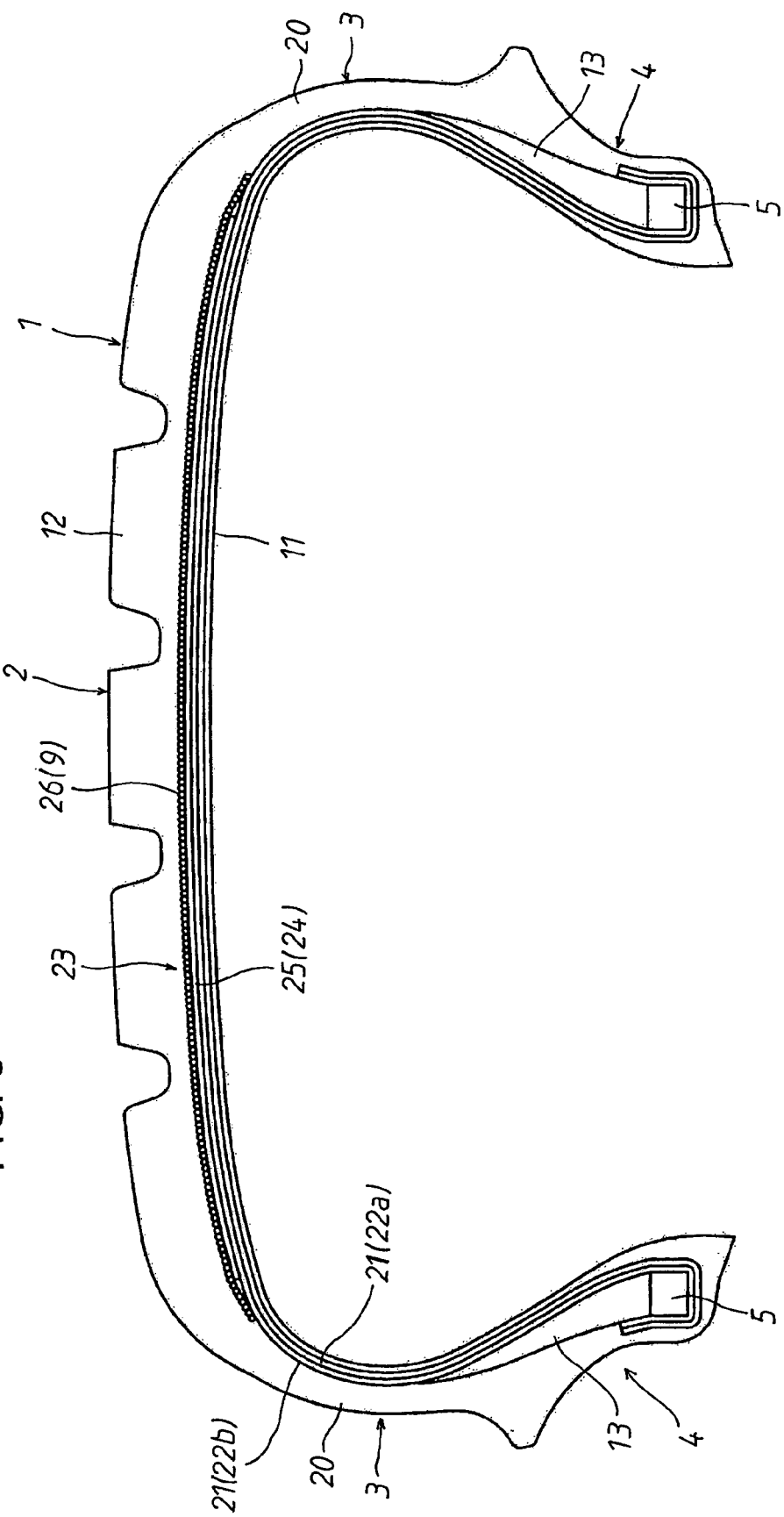
FIG. 6 is a sectional view of a radial tire, taken in a tire radial direction, having circumferentially spirally wound belt layers in a second embodiment.

In a second embodiment, as shown in FIGS. 6 and 7, body ply cords 22 are coated with rubber and are parallel arranged in a body ply 21 composed of two layers 22a and 22b at an oblique angle in the range of 85 to 90 degrees relative to the tire circumferential direction. A two-layer belt layer 23 is arranged on the outer circumference of the body ply 21. The first layer inside in the tire radial direction is an oblique belt layer 25, in which belt cords 24 made of steel are coated with rubber and are arranged in a single layer to be inclined at an angle in the range of 10 to 40 degrees, preferably at an angle of 20 degrees. The second layer is a spirally wound belt layer 26 in which one or more belt cords 9 coated with rubber 8 as shown in FIG. 3(a) or 3(b) are spirally wound in a single layer at an oblique angle in the range of 0 to 9 degrees almost parallel with the tire circumferential direction.

Figure 8:
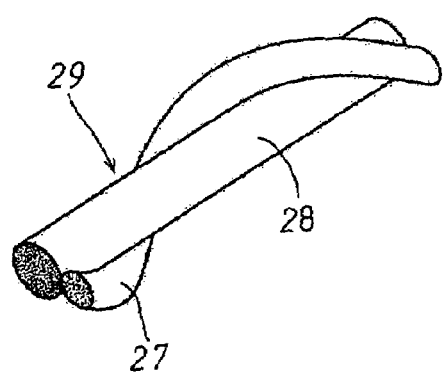
FIG. 8 is a perspective view of a hybrid cord.

For the belt cord 9 in the spirally wound belt layer 26, there is used a hybrid cord 29 (refer to FIG. 8) which is structured by twisting an aramid fiber bundle 27 (e.g., Aramid 1100 dtex) typifying aromatic polyamid fiber cords with a nylon fiber bundle 28 (e.g., Nylon 940 dtex) of aliphatic polyamide system. As indicated at (b) in FIG. 4, the property of tensile load to stretch rate of the hybrid cord 29 is such that the tensile load attains 80 N larger than 60 N at the stretch rate of 3% and attains 300 N at the stretch rate of 6% and that the increase rate of tensile load to stretch rate becomes small in a stretch rate range of about 3% or less which is a predetermined value, but becomes large in another stretch rate range exceeding the predetermined value. The tensile load to stretch rate can be increased by bundling plural hybrid cords 29. In the later mentioned second embodiment, three hybrid cords 29 were bundled to make a cord of 1.08 Φmm in cord diameter for use as the belt cord 9. It is possible to vary the aforementioned predetermined value by adjusting the twisting structure.

In the second embodiment, the belt layer 23 comprise an oblique belt layer 25 arranging therein high rigidity steel cords 24 to incline at a small angle (in the range of 10 to 40 degrees) relative to the circumferential direction and a spirally wound belt layer 26 spirally arranging one or more rubber-coated belt cords 9 almost in parallel (in the range of 0 to 9 degrees) with the tire circumferential direction. Thus, the hoop effect can be exercised very strongly on the body ply 6, so that improvements can be made in the braking performance and the steering stability. Further, since the oblique belt layer 25 including the steel cords 24 is one layer, it can be realized to lighten the tire as well as to achieve an advantage of a small rolling resistance. In addition, since the belt cord 9 used for the spirally wound belt layer 26 is made of a bundle of plural hybrid cords 29 each making a core with the nylon fiber bundle 28 and having the aramid fiber bundle 27 twisted therearound, the belt cord 9 can be obtained as that which is proper in the increase rate of tensile load to stretch rate and which is light. Therefore, it can be also realized to lighten the tire as well as to reduce the occurrence of defectives in the tire production.

Figure 9:
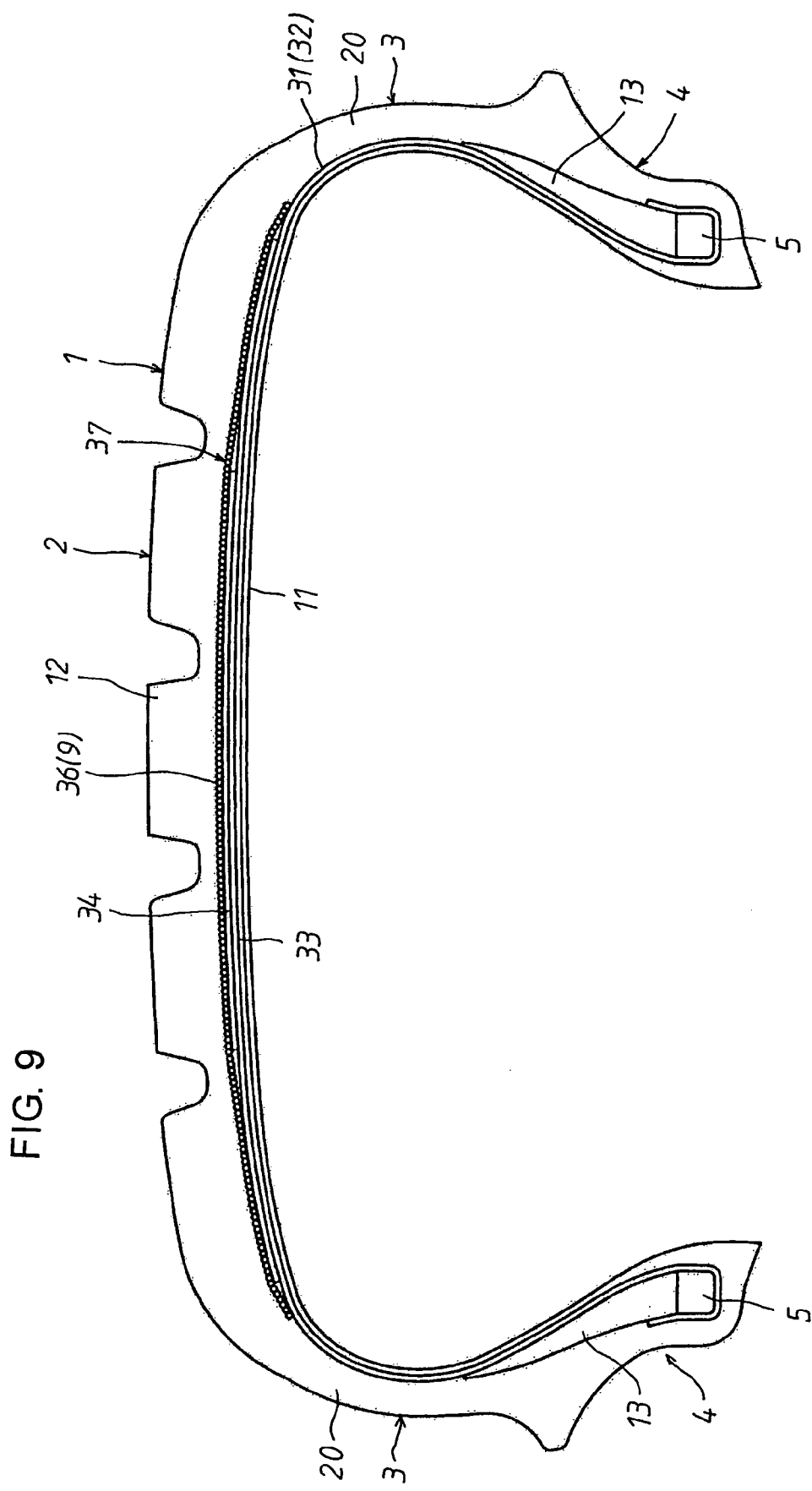
FIG. 9 is a sectional view of a radial tire, taken in a tire radial direction, having circumferentially spirally wound belt layers in a third embodiment.
Figure 10:
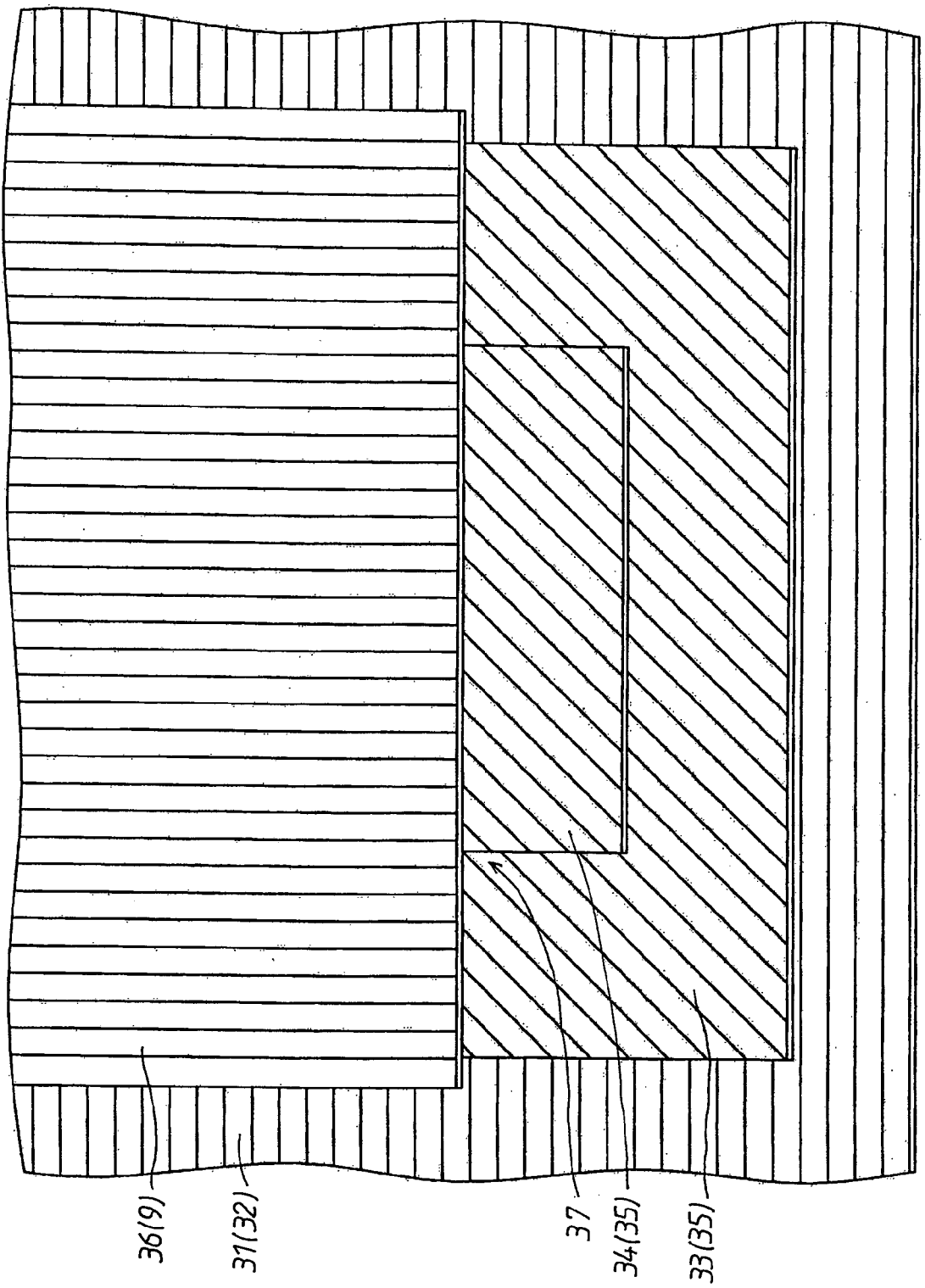
FIG. 10 is a figure showing a body ply and the belt layers in the third embodiment.

In a third embodiment, as shown in FIGS. 9 and 10, body ply cords 32 are parallel arranged in a single body ply 31 to be coated in a rubber layer at an oblique angle in the range of 85 to 90 degrees relative to the tire circumferential direction. Two oblique belt layers 33 and 34 are arranged on the outer circumference of the body plies 31 in the circumferential direction. In the two oblique belt layers 33 and 34, respective belt cords 35 made of steel are arranged at an angle in the range 30 to 60 degrees (preferably, in the range of 40 to 50 degrees) relative to the circumferential direction with themselves extending at the same oblique angle in the same direction. Of the two oblique belt layers 33 and 34, the oblique belt layer 34 at the outer side is made to be in the range of 40 to 70% of the oblique belt layer 33 at the inner side in width and is arranged at the center portion in the direction of the radial tire width. Conversely, the width of the oblique belt layer 33 at the inner side may be made to be in the range of 40 to 70% of that of the oblique belt layer at the outer side. On the outer circumference of the two oblique belt layers 33 and 34, a spirally wound belt layer 36 is formed by spirally winding a belt cord 9 almost in parallel with the tire circumferential direction. The belt cord 9 is made by bundling and rubber-coating three hybrid cords 29 each of which is small in the increase rate of tensile load to stretch rate in a smaller stretch rate range than a predetermined stretch rate range but is large in the increase rate of tensile load in another range exceeding the predetermined stretch rate. A belt layer 37 is composed of the two oblique belt layers 33, 34 and the spirally wound belt layer 36.

In the third embodiment, the two oblique belt layers 33, 34 in which the belt cords 35 made of steel are arranged to incline in the same direction at the same oblique angle relative to the circumferential direction are wound at the outer circumference of the body ply 31, and the belt cord 9 made of the hybrid cord 29 and coated with rubber is arranged at the outer circumference of the oblique belt layers 33, 34 in a spiral winding fashion to extend almost in parallel with the tire circumferential direction. Thus, the ground contact surface is made to be even and flat, whereby also with the hoop effect by the circumferentially spirally wound belt layer, improvements can be made in the steering stability, the wear resistance and the braking performance of the tire and particularly, in the braking performance on wet roads.

It has been a practice that in the structural arrangement of steel belts, two belt layers are arranged to be wound with respective belt cords oriented in opposite directions to cross mutually. In that case, respective belt cords interfere to be twisted, and this causes the distribution of the ground contact pressure on the ground contact surface to be uneven and not to become flat, so that though the ground contact area appears unchanged, there is decreased a substantial ground contact area which works for the braking performance and the steering stability. On the other hand, in the third embodiment, since the two oblique belt layers 33, 34 are wound with the respective belt cords inclined at the same angle in the same direction, the distribution of the ground contact pressure on the ground contact surface becomes even and flat, so that though the ground contact area appears unchanged, the substantial ground contact area which works for the braking performance and the steering stability can be made to be large thereby to improve the braking performance and the steering stability.

Further, since one oblique belt layer 34 of the two oblique belt layers 33, 34 is in the range of 40 to 70% of the other oblique belt layer 33 in width and is circumferentially arranged at the center portion in the direction of the radial tire width, the floating motion which is liable to occur at the center portion of the tread surface when a sudden increase in load is brought about by braking can be suppressed, and the flexibility of the tread surface can be maintained. Where the width of the oblique belt layer 34 is made to be narrower than the 40% width of the oblique belt layer 33, the center portion of the tread section becomes liable to float, and where it is made to be more than the 70% width of the oblique belt layer 33, the flexibility of the tread section is deteriorated to make the riding comfortableness and the noise in the car worse.

Fourth and fifth embodiments which will be described hereafter are different from the third embodiment only in the structure that a ply 41 under the oblique belt layers is arranged between the oblique belt layer 33 and the outer circumference of the body ply 31. Therefore, this difference will be described, and other components given the same reference numerals as those in the third embodiment will be omitted from being described.

Figure 11:
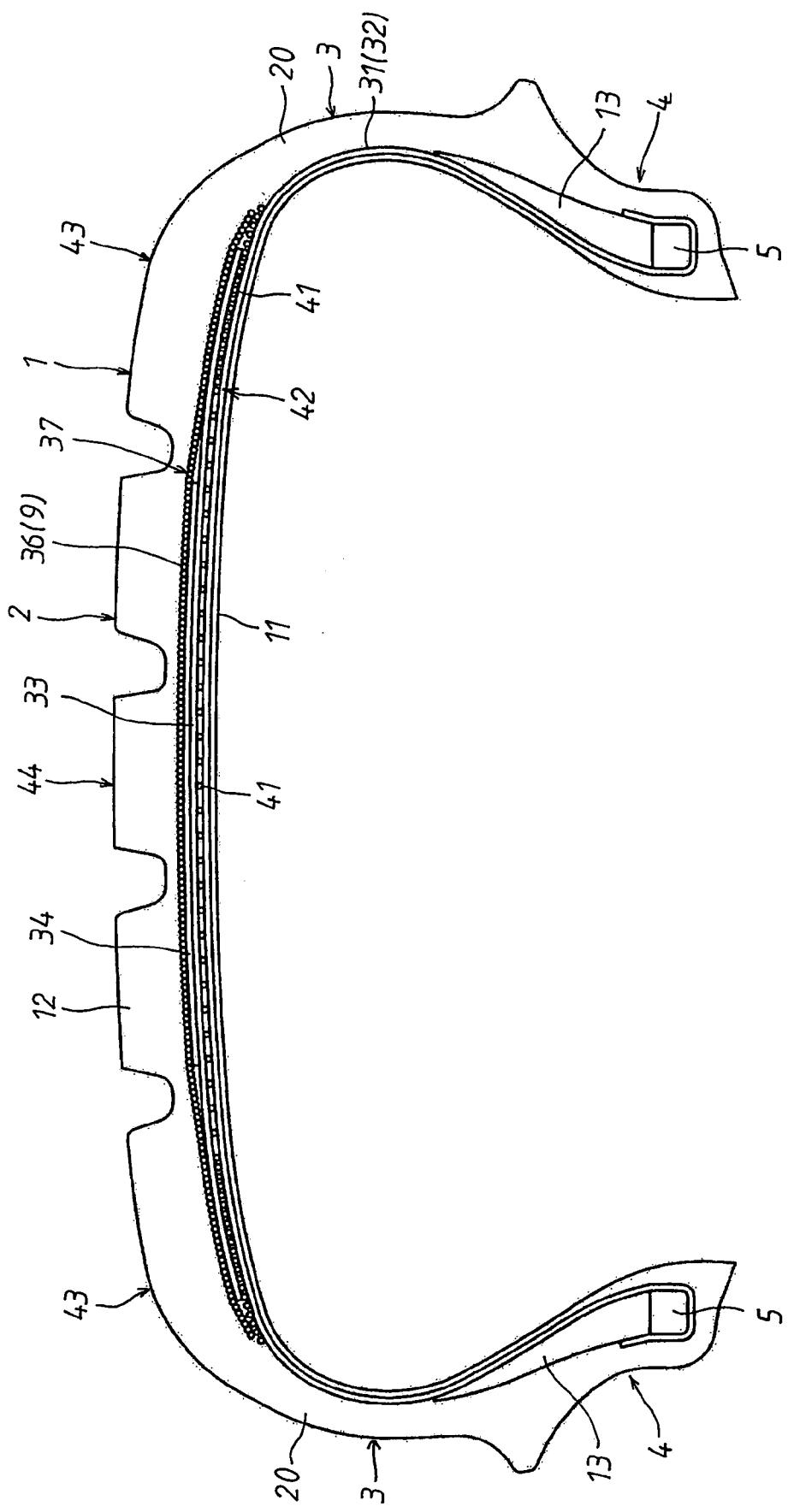
FIG. 11 is a sectional view of a radial tire, taken in a tire radial direction, having a circumferentially spirally wound belt layer in a fourth embodiment.
Figure 12:
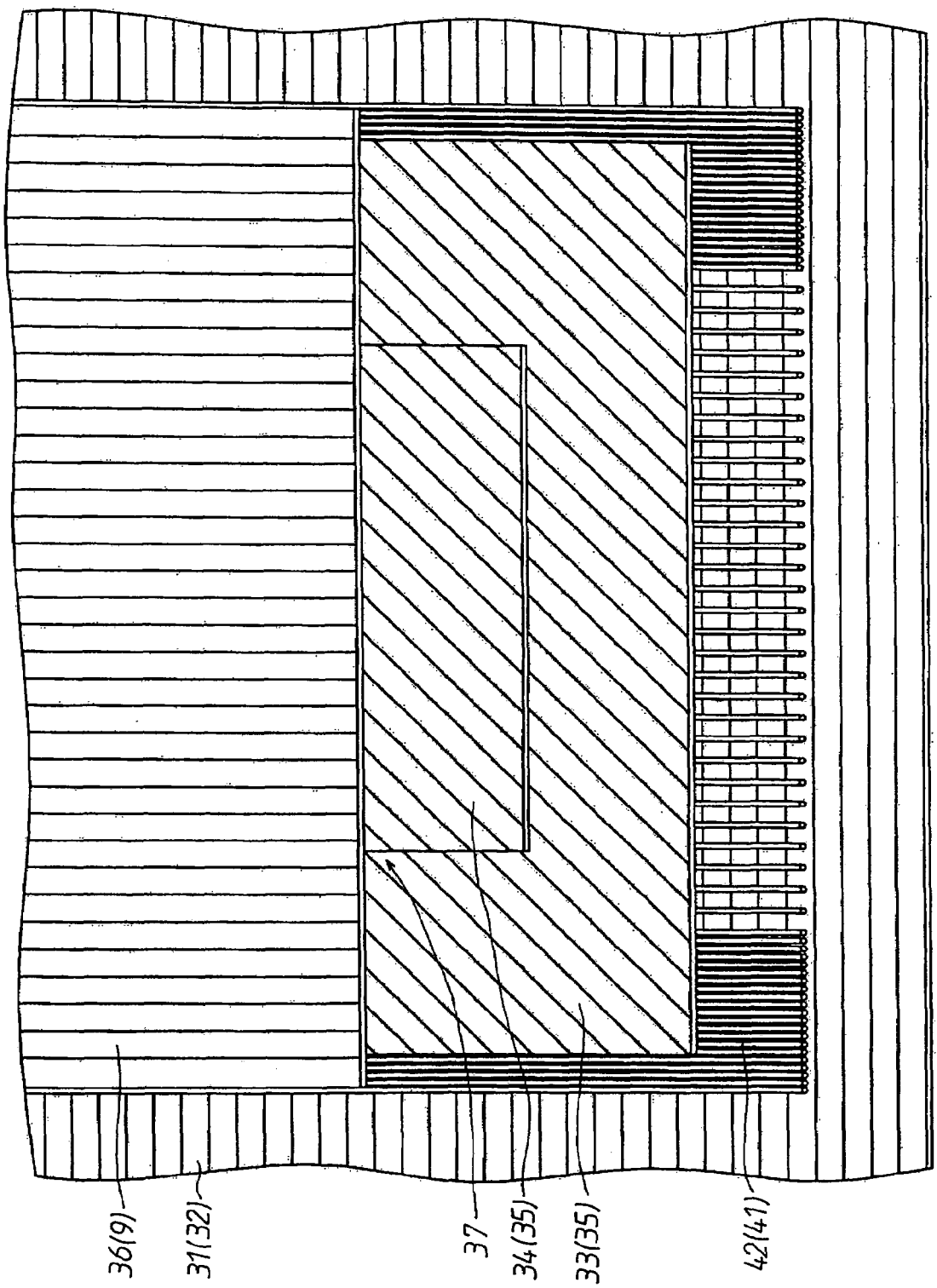
FIG. 12 is a figure showing the arrangement of a body ply, the oblique belt layers and a ply under the oblique belt layers in the fourth embodiment.

In the fourth embodiment, as shown in FIGS. 11 and 12, an organic fiber cord 41 made of a single hybrid cord 29 or plural twisted hybrid cords 29 is coated with rubber and is arranged to be spirally wound between the oblique belt layers 33, 34 and the outer circumference of the body ply 31 almost in parallel with the circumferential direction thereby to form a ply 42 under the oblique belt layers. The number of the organic fiber cords 41 arranged in the ply 42 under the oblique belt layers is such that each of the shoulder portions 43 on the side edges in the direction of the radial tire width is densified to have the organic fiber cords 41 in the number of 14±10 or so per 10 mm and that the center portion 44 is made to be loose and to have the organic fiber cords 41 of the number in the range of 40 to 85%, desirably in the range of 50 to 80% of those at each shoulder portion 43. At the center portion 44, the organic fiber cords 41 may be arranged to be gradually loose toward the tire center. When an expansible shape is expanded with the green tire placed in a vulcanizing mold, the organic fiber cord 41 made of the hybrid cord 29 moderately stretches not to deteriorate the entire shape of the tire.

In this manner, the ply 42 under the oblique belt layers is arranged to extend from the shoulder portions 43 to the center portion 44 on the outer circumference of the body ply 31. Thus, when a sudden load acts upon braking, the ply 42 under the oblique belt layers suppresses the separations between the body ply cords 32, so that differences in tension among the body ply cords 32 can be lessened to enhance the braking performance. Further, when having an inside pressure applied thereto, the tire can be further stabled to keep its predetermined shape. In addition, the organic fiber cord 41 in the ply 42 under the oblique belt layers is arranged to be densified at the shoulder portions 43 and to be loose at the center portion 44. Thus, when the inside pressure is applied to the tire, the ground contact state of the shoulder portions 42 can be kept stable because of the densified arrangement of the organic fiber cord 41 thereat. As a consequence, it can be realized to remarkably enhance the steering stability and the braking performance of the tire on wet roads and also to enhance the braking performance and the wear resistance on dry roads. While the floating of the center portion 44 due to the centrifugal force is suppressed primarily by the belt layer 37, the organic fiber cord 41 is arranged to be loose at the center portion 44, whereby the separations between the body ply cords 32 and the floating due to the centrifugal force can be suppressed without deteriorating the flexibility.

Figure 13:
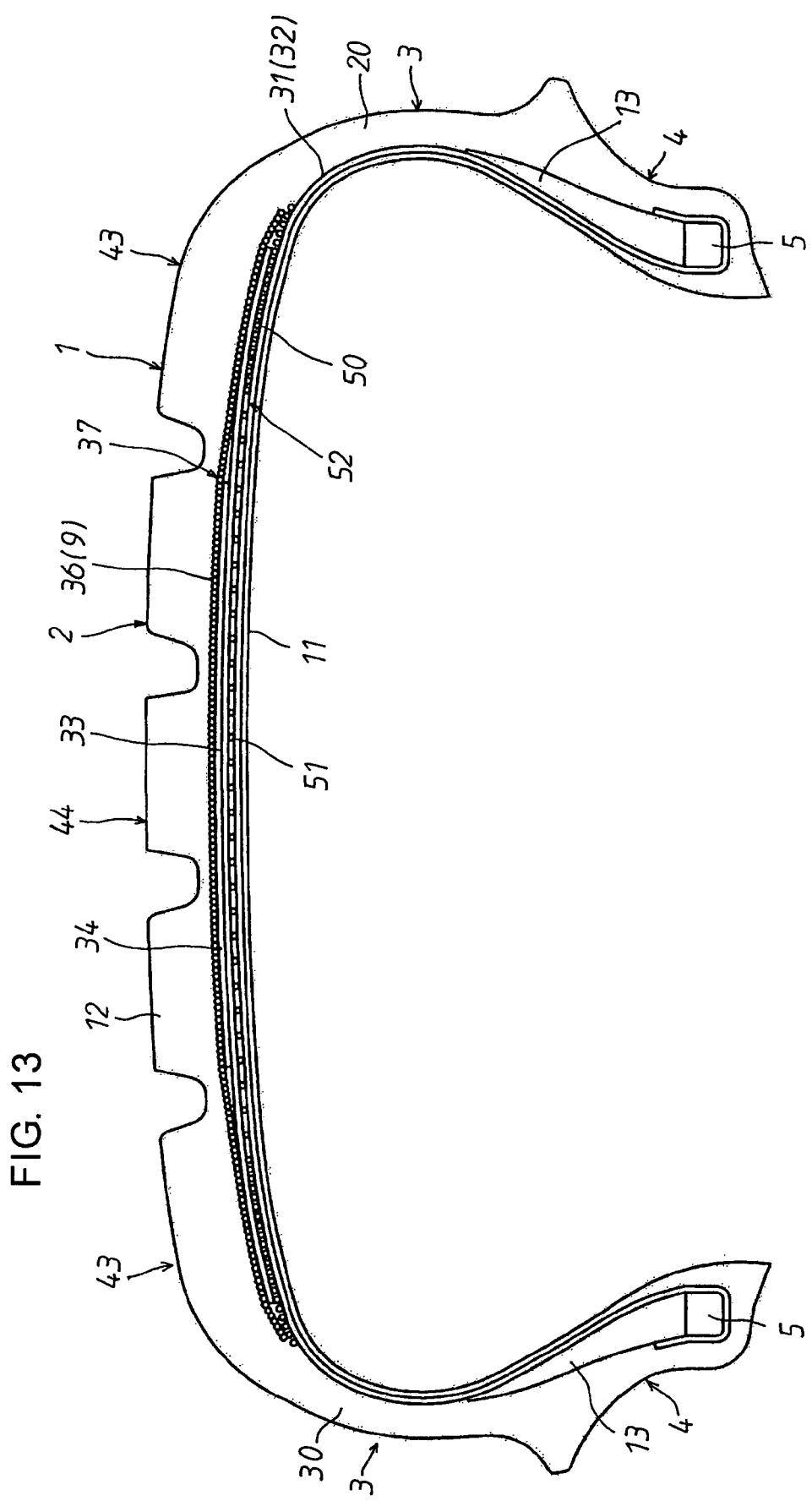
FIG. 13 is a sectional view of a radial tire, taken in a tire radial direction, having a circumferentially spirally wound belt layer in a fifth embodiment.

In the fifth embodiment shown in FIGS. 13 and 14, a waved steel cord 50 given a waving processing as shown in FIG. 15 is coated with rubber and is arranged to be spirally wound between the oblique belt layers 33, 34 and the outer circumference of the body ply 31 at each of the shoulder portions 43 almost in parallel with the circumferential direction. As the waved steel cord 50, it is preferred to use one which meets the requirements that a value H/d which is obtained by dividing the amplitude H (i.e., the distance between the top of a wave and the top of another wave directed in the opposite direction) by a cord diameter d comes in the range of 1.1 to 3.0 and that a value L/d which is obtained by dividing the wavelength L by the cord diameter comes in the range of 2 to 100. In the later described fifth embodiment, a cord having a 1×3×0.20 structure (a cord which was made by twisting three filaments 53 each with 0.20 Φmm) and also having its cord diameter of 0.424 Φmm before the waving processing was given the waving processing to be formed to a wave shape with the amplitude H=0.68 mm and the wavelength L=2.0 mm, and the cord so waved was used.

When an expansible shape is expanded with the green tire placed in a vulcanizing mold, the waved steel cords 50 are moderately stretched not to deteriorate the entire form of the tire. At the center portion 44, an organic fiber cord 51 made of the single hybrid cord 29 or the plural twisted hybrid cords 29 is spirally wound and arranged to be loose between the oblique belt layers 33, 34 and the outer circumference of the body ply 31 almost in parallel with the circumferential direction. A ply 52 under the oblique belt layers is formed with the steel cord 50 arranged at the shoulder portions 43 and with the organic fiber cord 51 arranged at the center portion 44.

According to the fifth embodiment, as is the case of the fourth embodiment, when a sudden load acts upon braking, the ply 52 under the oblique belt layers suppresses the separations between the body ply cords 32, so that differences in tension among the body ply cords 32 can be lessened to enhance the braking performance. Further, since the waved steel cord 50 is employed for the material at the shoulder portions 43 of the ply 52 under the oblique belt layers, the shoulder portions 43 are increased in rigidity and are further stabilized in the ground contact state upon sudden braking. Thus, remarkable improvements can be made in the braking performance and the steering stability of the tire on wet roads, and improvements can also be made in the braking performance and the wear resistance on dry roads. By the organic fiber cord 51 spirally wound to be loose, the floating of center portion 44 can be suppressed to the extent that the flexibility cannot be deteriorated.

Although in the fourth and fifth embodiments, the organic fiber cords 41, 51 each made of the single hybrid cord 29 or the plural twisted hybrid cords 29 are used to form the plies 42, 52 under the oblique belt layers respectively, an ordinary organic fiber cord, that is, a cord (e.g., Nylon 1400detex/2) made by twisting two nylon fiber bundles may be used to form the plies 42, 52 under the oblique belt layers.

Figure 16:
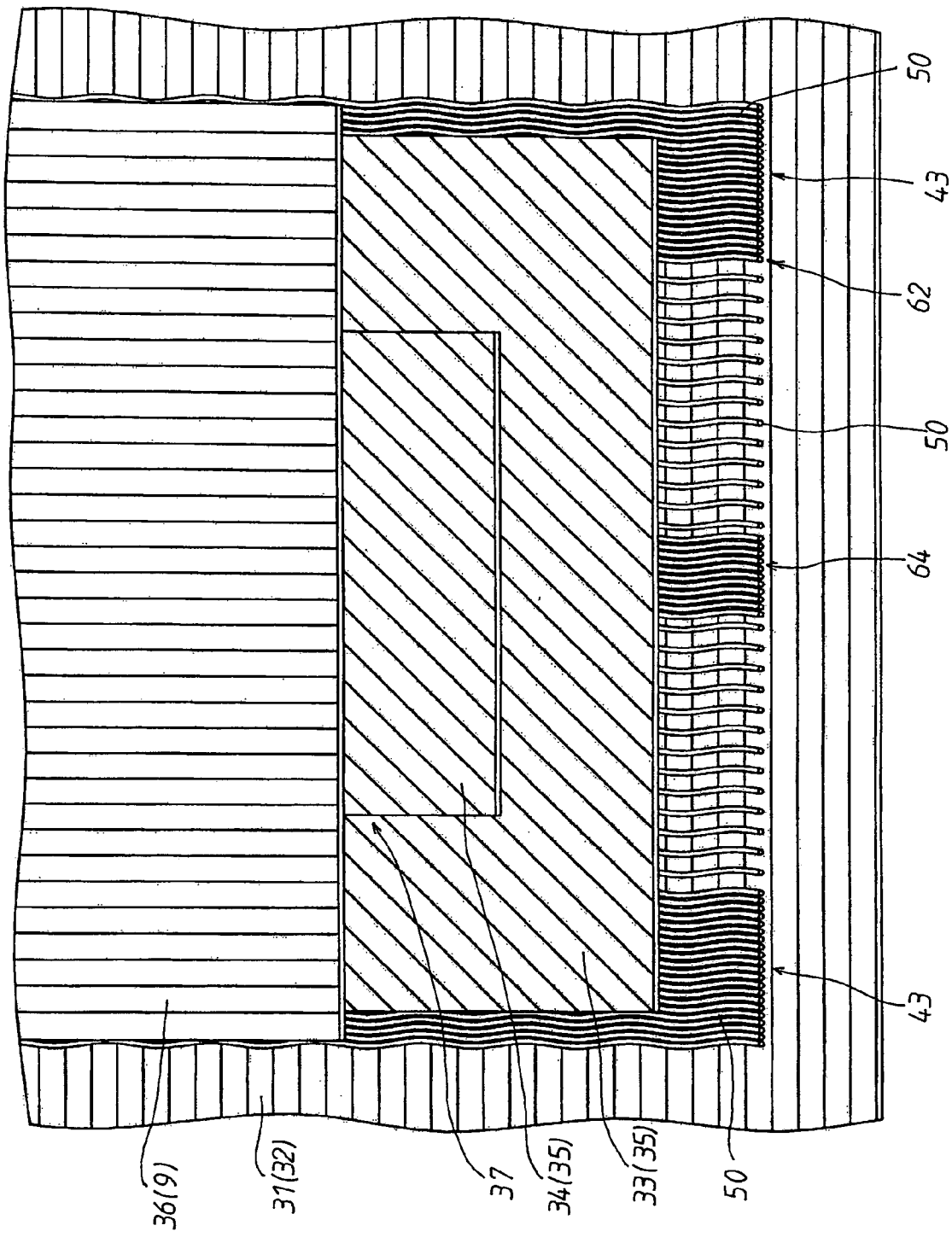
FIG. 16 is a figure showing the arrangement of a body ply, oblique belt layers and a ply under the oblique belt layers in a sixth embodiment.

In a sixth embodiment, as shown in FIG. 16, the waved steel cord 50 (refer to FIG. 15) given the waving processing is coated with rubber and is arranged to be spirally wound between the oblique belt layer 33 and the outer circumference of the body ply 31 almost in parallel with the circumferential direction thereby to form a ply 62 under the oblique belt layers. The number of the steel cords 50 arranged in the ply 62 under the oblique belt layers is such that each of the shoulder portions 43 on the side edges in the direction of the radial tire width and the center portion 64 is densified to have the steel cords 50 in the number of 14±10 or so per 10 mm and that a portion between each shoulder portion 43 and the center portion 64 is made to be loose and to have the steel cords 50 of the number in the range of 40 to 85%, preferably in the range of 50 to 80% of those at each shoulder portion 43. When an expansible shape is expanded with the green tire placed in a vulcanizing mold, the waved steel cord 50 is moderately stretched not to deteriorate the entire shape of the tire. In place of the waved steel cords 50, the organic fiber cord 51 made of the hybrid cord 29 may be used for the cord in the ply 62 under the oblique belt layers.

According to the sixth embodiment, the ply 62 under the oblique belt layers is arranged on the outer circumference of the body ply 31 to extend from the shoulder portions 43 to the center portion 64, and thus, when a sudden load acts upon braking, the ply 62 under the oblique belt layers suppresses the separations between the body ply cords 32, so that differences in tension among the body ply cords 32 can be lessened to enhance the braking performance. In addition, since the cord in the ply 62 under the oblique belt layers is arranged to be densified at the shoulder portions 43 and the center portion 64 but to be loose at the portion between each shoulder portion 43 and the center portion 64, the loose areas help to lighten the tire, and at the same time, the ground contact state is kept to be always stable at the shoulder portions 43 and the center portion 64 where the cord arrangement is densified. As a consequence, remarkable improvements can be made in the steering stability and the braking performance of the tire on wet roads, and improvements can also be made in the braking performance and the wear resistance on dry roads. Because the cord arrangement is densified at the center portion 64, the floating of the center portion in high speed traveling can be suppressed to improve the steering stability in high speed traveling. Accordingly, the tire is suitable for use as those for sports-oriented vehicles in which importance is placed on the steering stability.

Figure 17:
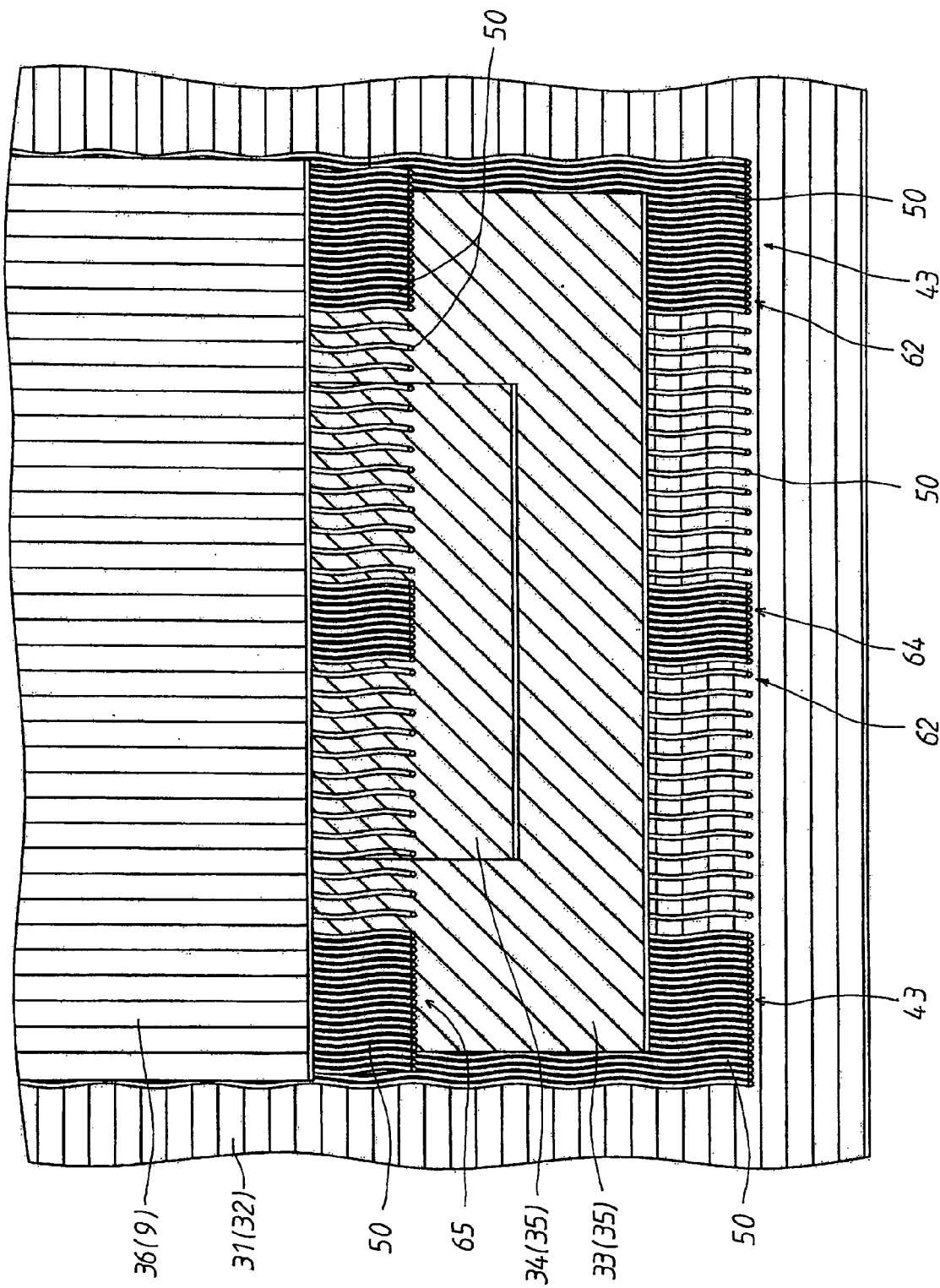
FIG. 17 is a figure showing the arrangement of a body ply, oblique belt layers, a ply under the oblique belt layers and a ply under a spirally wound belt layer in a seventh embodiment.

A seventh embodiment shown in FIG. 17 is such that in the sixth embodiment, the waved steel cord 50 (refer to FIG. 15) given the waving processing is coated with rubber and is also arranged to be spirally wound between the circumferentially spirally wound belt layer 36 and the oblique belt layers 33, 34 almost in parallel with the circumferential direction thereby to form a ply 65 under the spirally wound belt layer. The number of the steel cords 50 arranged in the ply 65 under the spirally wound belt layer is such that each of the shoulder portions 43 on the side edges in the direction of the radial tire width and the center portion 64 is densified to have the steel cords 50 in the number of 14±10 or so per 10 mm and that the portion between each shoulder portion 43 and the center portion 64 is made to be loose and to have the steel cords 50 of the number in the range of 40 to 85%, preferably in the range of 50 to 80% of those at each shoulder portion 43. When an expansible shape is expanded with the green tire placed in a vulcanizing mold, the waved steel cord 50 is moderately stretched not to deteriorate the entire shape of the tire. In place of the waved steel cord 50, the organic fiber cord 51 made of the hybrid cord 29 may be used for the cord in the ply 65 under the spirally wound belt layer.

According to the seventh embodiment, when a sudden load acts upon braking, the ply 62 under the oblique belt layers suppresses the separations between the body ply cords 32, so that differences in tension among the body ply cords 32 can be lessened to enhance the braking performance. In addition, the shoulder portions 43 and the center portion 64 are heightened in rigidity, and the ground contact state at the shoulder portions 43 upon sudden braking is stabilized. As a consequence, remarkable improvements can be made in the braking performance and the steering stability of the tire on wet roads, and improvements can also be made in the braking performance and the wear resistance on dry roads. The floating of the center portion in high speed traveling can be suppressed to improve the steering stability in high speed traveling. Furthermore, since the ply 65 under the spirally wound belt layer is arranged between the circumferentially spirally wound belt layer 36 and the oblique belt layers 33, 34, the hoop effect on the body ply 32 can further be strengthened thereby to improve the steering stability and the wear resistance. In addition, since the steel cords 35 of the oblique belt layers 33, 34 are tightly sandwiched and tied by the ply 65 under the spirally wound belt layer and the ply 62 under the oblique belt layers at the shoulder portions 43 and the center portion 64, the movements of the steel cords 35 in the oblique belt layers 33, 34 are restricted during the rolling of the tire, whereby the noise in the car can be reduced.

Figure 18:
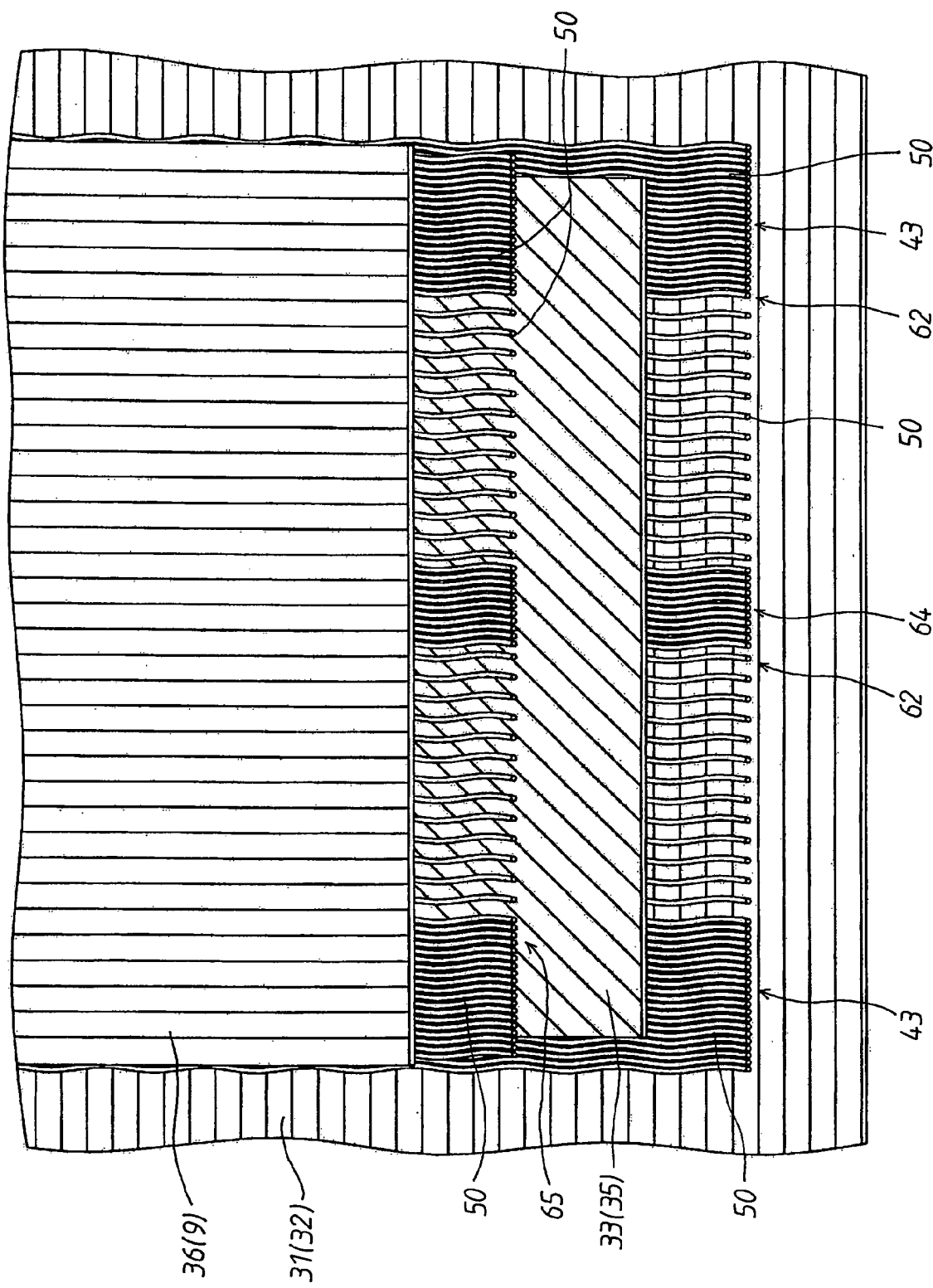
FIG. 18 is a figure showing an eighth embodiment wherein the belt layers in FIG. 17 are modified to include one oblique belt layer.

An eighth embodiment shown in FIG. 18 is such that in the seventh embodiment, the oblique belt 34 is removed to leave the oblique belt 33 only. In comparison with the seventh embodiment, the eighth embodiment is advantageous in lightening the tire though the operation and effect of the oblique belt 34 can no longer be expected.

Figure 19:
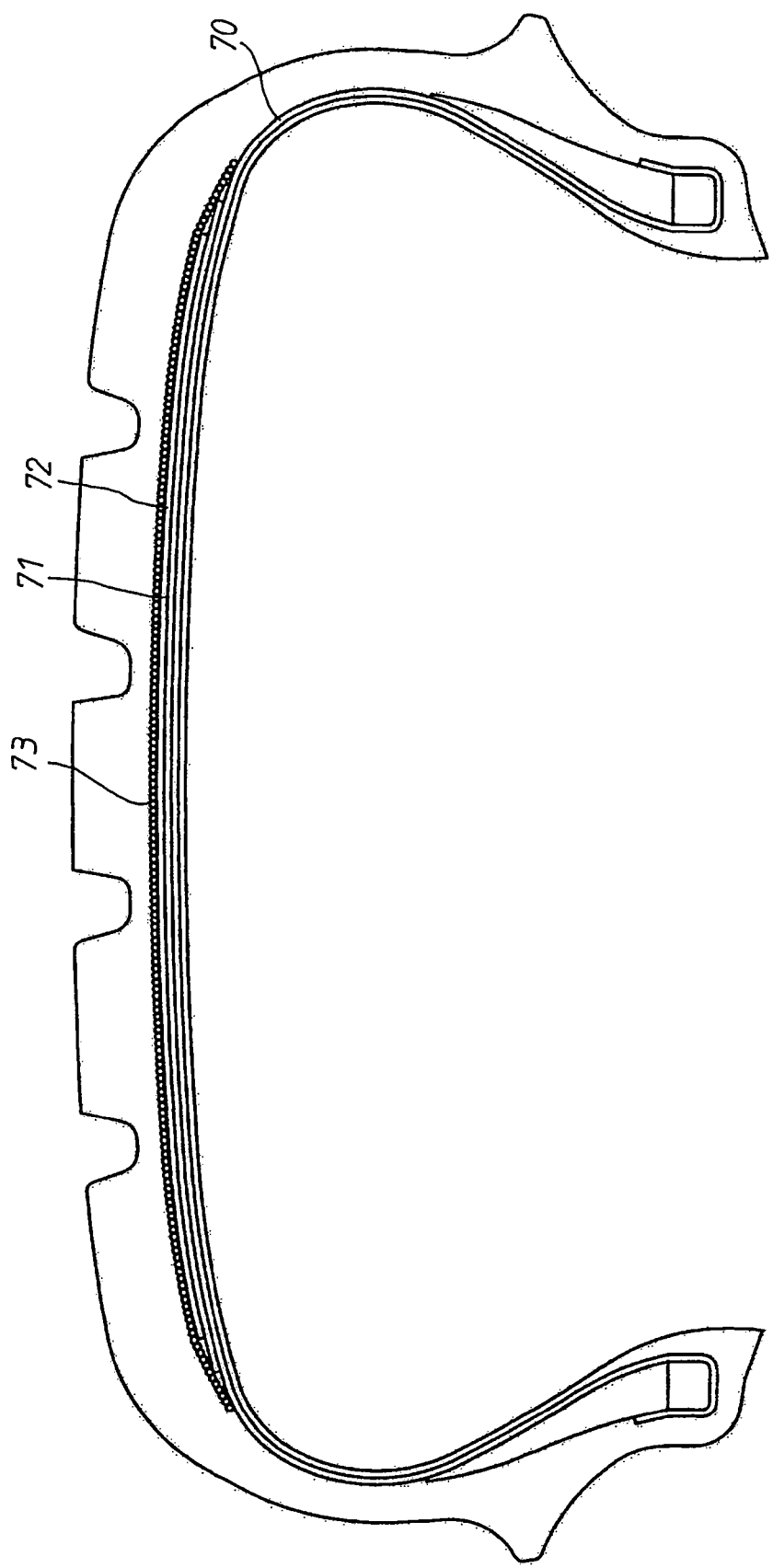
FIG. 19 is a sectional view of a prior art radial tire taken in a tire radial direction.

Next, the tires of Examples 1 to 5 were manufactured based on the foregoing first to fifth embodiments and were compared with a trial tire which is shown as prior art in FIGS. 19 and 20 to show the test results of comparison in performance. Used for compassion were low-aspect pneumatic tires each having a tire size of 215/45ZR17, and tests were carried out for dry-road braking performance, wet-road braking performance, steering stability and wear resistance. Each test result was evaluated using an index compared with the index 100 given to the result of the prior art trial tire. Values of the test results are indicated in Table 1, wherein a larger index means a better performance.

For dry-road braking test, the compared tires were attached to a car with an anti-skid brake system (ABS) and were tested by making the car run on a test course. The car running on a dry straight road at the speed of 100 km/h was suddenly braked to the extent that the ABS works, and the braking distance through which the car ran until stopped was measured.

For wet-road braking test, the compared tires were attached to the car with the ABS. The car running on a wet road of about 1 mm water depth at the speed of 100 km/h was suddenly braked to the extent that the ABS works, and the braking distance through which the car ran until stopped was measured.

For steering stability, the compared tires were attached to rims of the type 7JJ, and air was filled in each tire to make the inside pressure 240 kPa. The rims were attached to a car with an engine having the displacement of 2000 cc (i.e., 2-liter engine), and the car was steered to go straight ahead and to make lane changes at speeds in the range of 60 to 180 km/h on a circuit course. The steering stability was evaluated in dependence on the driver's feeling.

For wear resistance, after having had the compared tires attached thereto, the car was made to run on highways and ordinary roads at an 1-to-1 ratio through the distance of 15,000 km, and thereafter, the wear states of the tires were evaluated by measuring the remaining tread groove depth of each tire.

TABLE 1

|  | Prior Art Trial Tire | Example 1 | Example 2 | Example 3 | Example 4 | Example 5 |
| --- | --- | --- | --- | --- | --- | --- |
| Dry Braking Performance | 100 | 101 | 102 | 102 | 104 | 104 |
| WetBraking Performance | 100 | 103 | 104 | 107 | 111 | 115 |
| Steering Stability | 100 | 101 | 102 | 105 | 107 | 107 |
| Wear Resistance | 100 | 100 | 100 | 102 | 102 | 102 |

The foregoing first to fifth embodiments respectively employ the belt cords 9 whose properties of tensile load to stretch rate are respectively the properties (a) and (b) shown in FIG. 4. In a modification, a belt cord may be selected from belt cords which have a property between the properties (a) and (b), that is, a property that the stretch rate indicates 0.5% or more at the tensile load of 20 N and that the tensile load indicates 60N or more at the stretch rate of 3% (preferably, the tensile load indicates 30N or more at the stretch rate of 1.5%) and which meet the vulcanizing and forming conditions. In this case, when expanded in its outer diameter at an expansion rate in the range of 0.5 to 3%, the green tire can be vulcanized and formed with various parts thereof reliably fit in each segment and hence, with the entire shape thereof kept properly.

INDUSTRIAL APPLICABILITY

The radial tire with a circumferentially spirally wound belt layer according to the present invention is suitable for use as tires for wheels of motor vehicles.

The invention claimed is:

1. A radial tire having a body ply extending from a tread section to sidewall sections and turned up over bead cores of bead sections to have turned-up portions at both sides thereof; a belt layer wound on an outer circumference of the body ply in a tire circumferential direction; a tread circumferentially wound on an outer circumference of the belt layer; and bead fillers extending from the bead cores radially outward between the sidewall sections and the turned-up portions of the body ply, wherein:

the belt layer comprises at least one spirally wound belt layer in which one or plural belt cords coated with rubber are arranged to be spirally wound substantially in parallel with the tire circumferential direction; and the belt cord in the spirally wound belt layer has a property that an increase rate of tensile load to stretch rate is small in a range of a predetermined stretch rate or less but is large in another range exceeding the predetermined stretch rate, and wherein the belt cord in the spirally wound belt layer has a property that the stretch rate is equal to or greater than 0.5% at tensile load of 20 N, and wherein the tensile load is equal to or greater than 60 N at stretch rate of 3% of the tensile load or is equal to or greater than 30 N at the stretch rate of 1.5%, wherein:

the body ply is arranged to be at least one layer;

body ply cords of the body ply are inclined at an angle in the range of 85 to 90 degrees relative to the circumferential direction; and the belt layer arranged on the outer circumference of the body ply comprises two oblique belt layers in which belt cords made of steel are arranged to be inclined in the same direction at the angle in the range of 30 to 60 degrees or in the range of 40 to 50 degrees relative to the circumferential direction and at least one spirally wound belt layer in which a belt cord made of a hybrid cord is coated with rubber and is arranged to be spirally wound on outer circumferences of the oblique belt layers substantially in parallel with the tire circumferential direction; and of the two oblique belt layers, one oblique belt layer is in the range of 40 to 70% of the other oblique belt layer in width and is circumferentially arranged at a center portion in a direction of the radial tire width.

2. The radial tire with the circumferentially wound belt layer as set forth in claim 1, wherein the belt cord in the spirally wound belt layer includes a hybrid cord having a nylon fiber bundle as a core and also includes an aramid fiber bundle twisted therearound.

3. The radial tire with the circumferentially wound belt layer as set forth in claim 1, wherein:

an organic fiber cord made of a hybrid cord is coated with rubber and arranged to be spirally wound between the oblique belt layers and the outer circumference of the body ply substantially in parallel with the circumferential direction thereby to form a ply under the oblique belt layers; and the organic cord in the ply under the oblique belt layers is arranged to be densified at shoulder portions on side edges in the direction of the radial tire width and to be loose at a center portion.

4. The radial tire with the circumferentially wound belt layer as set forth in claim 1, wherein a ply under the oblique belt layers is composed of:

a waved steel cord coated with rubber and arranged to be spirally wound and to be densified between the oblique belt layers and the outer circumference of the body ply at shoulder portions on side edges in the direction of the radial tire width substantially in parallel with the circumferential direction; and an organic fiber cord made of a hybrid cord coated with rubber and arranged to be spirally wound and to be loose between the oblique belt layers and the outer circumference of the body ply at the center portion substantially in parallel with the circumferential direction.

5. The radial tire with the circumferentially wound belt layer as set forth in claim 1, wherein:

a cord which is small in the increase rate of tensile load to stretch rate in the range of a predetermined stretch rate or less but is large in the increase rate of the tensile load in another range exceeding the predetermined stretch rate is coated with rubber and is arranged to be spirally wound between the oblique belt layers and the outer circumference of the body ply substantially in parallel with the circumferential direction thereby to form a ply under the oblique belt layers; and the cord in the ply under the oblique belt layers is arranged to be densified at shoulder portions on side edges in the direction of the radial tire width and at a center portion, but to be loose at a portion between each shoulder portion and the center portion.

6. The radial tire with the circumferentially wound belt layer as set forth in claim 5, wherein:

a cord which is small in the increase rate of tensile load to stretch rate in the range of a predetermined stretch rate or less but is large in the increase rate of the tensile load in another range exceeding the predetermined stretch rate is coated with rubber and is arranged to be spirally wound between the spirally wound belt layer and the oblique belt layers substantially in parallel with the circumferential direction thereby to form a ply under the spirally wound belt layer; and the cord in the ply under the spirally wound belt layer is arranged to be densified at shoulder portions on side edges in the direction of the radial tire width and at a center portion, but to be loose at the portion between each shoulder portion and the center portion.

7. The radial tire with the circumferentially wound belt layer as set forth in claim 1, wherein both side ends of the spirally wound belt layer cover both side ends of the oblique belt layers.

* * * * *